US010685197B2

(12) United States Patent
Plummer et al.

(10) Patent No.: US 10,685,197 B2
(45) Date of Patent: Jun. 16, 2020

(54) SYSTEMS AND METHODS FOR TRACKING ITEMS

(71) Applicant: DIVINE LOGIC, INC., Fresno, CA (US)

(72) Inventors: Stephen Plummer, Fresno, CA (US); Alexander Plummer, Fresno, CA (US); Brandon Lundberg, Fresno, CA (US)

(*) Notice: Subject to any disclaimer, the term of this patent is extended or adjusted under 35 U.S.C. 154(b) by 0 days.

(21) Appl. No.: 16/194,764

(22) Filed: Nov. 19, 2018

(65) Prior Publication Data

US 2019/0156086 A1     May 23, 2019

Related U.S. Application Data

(60) Provisional application No. 62/675,772, filed on May 24, 2018, provisional application No. 62/588,261, filed on Nov. 17, 2017.

(51) Int. Cl.
| | |
|---|---|
| *G06K 7/10* | (2006.01) |
| *G06T 7/73* | (2017.01) |
| *G06T 5/00* | (2006.01) |
| *G06T 7/536* | (2017.01) |
| *G06K 7/14* | (2006.01) |

(Continued)

(52) U.S. Cl.
CPC ....... *G06K 7/10722* (2013.01); *G06K 7/1413* (2013.01); *G06T 5/006* (2013.01); *G06T 7/248* (2017.01); *G06T 7/536* (2017.01); *G06T 7/73* (2017.01); *G06T 7/74* (2017.01); *G06T 3/0006* (2013.01); *G06T 2207/30204* (2013.01); *G06T 2207/30244* (2013.01); *H04N 5/247* (2013.01)

(58) Field of Classification Search
CPC .. G06K 7/10722; G06K 7/1413; G06T 7/536; G06T 5/006; G06T 7/73; G06T 3/0006; G06T 2207/30244; G06T 2207/30204; H04N 5/247
See application file for complete search history.

(56) References Cited

U.S. PATENT DOCUMENTS

| | | |
|---|---|---|
| 5,193,124 A | 3/1993 | Subbarao |
| 5,602,760 A | 2/1997 | Chacon et al. |

(Continued)

OTHER PUBLICATIONS

Agarwala, A. et al. "Photographing Long Scenes with Multi-Viewpoint Panoramas": IEEE 8, 13; Transactions on Computing, vol. 58, No. 10; Publication [online] Jun. 2006.

(Continued)

*Primary Examiner* — Seung H Lee
(74) *Attorney, Agent, or Firm* — William K. Nelson; Mark D. Miller

(57) ABSTRACT

The present invention provides systems and methods for tracking items (e.g., commodities, goods, containers, boxes, packages, etc.) through transportations to multiple locations within a pre-defined space, to allow the position(s) and movement(s) of such items to be accurately tracked and documented, and to allow such items to be quickly identified and located based on tracking records kept within the tracking system. The system may utilize image sensors, image recognition and processes software, position translation software, and a virtual model of the pre-defined space in order to track objects within the defined space and maintain a record of the movement(s) and position(s) of the object within the pre-defined space.

30 Claims, 6 Drawing Sheets

(51) Int. Cl.
*G06T 7/246* (2017.01)
*H04N 5/247* (2006.01)
*G06T 3/00* (2006.01)

(56) References Cited

U.S. PATENT DOCUMENTS

| | | | |
|---|---|---|---|
| 5,691,527 A | 11/1997 | Nara et al. | |
| 5,726,435 A | 3/1998 | Hara et al. | |
| 5,745,036 A | 4/1998 | Clare | |
| 6,064,749 A | 5/2000 | Hirota et al. | |
| 6,078,849 A | 6/2000 | Brady et al. | |
| 6,175,644 B1 | 1/2001 | Scola et al. | |
| 6,266,008 B1 | 7/2001 | Huston et al. | |
| 6,434,254 B1 | 8/2002 | Wixson | |
| 6,919,880 B2 | 7/2005 | Morrison et al. | |
| 7,032,823 B2 | 4/2006 | Nojiri | |
| 7,194,330 B2 | 3/2007 | Carson | |
| 7,468,821 B2 | 12/2008 | Hashiguchi | |
| 7,512,262 B2 | 3/2009 | Criminisi et al. | |
| 7,646,336 B2 | 1/2010 | Tan et al. | |
| 7,663,671 B2 | 2/2010 | Gallagher et al. | |
| 7,864,159 B2 | 1/2011 | Sweetser et al. | |
| 8,144,920 B2 | 3/2012 | Kansal et al. | |
| 8,280,173 B2 | 10/2012 | Kato et al. | |
| 8,284,045 B2 | 10/2012 | Twitchell | |
| 8,381,982 B2 | 2/2013 | Kunzig et al. | |
| 8,526,672 B2 | 9/2013 | Momoi | |
| 8,561,897 B2 * | 10/2013 | Kunzig | G06Q 10/087 235/385 |
| 8,565,913 B2 * | 10/2013 | Emanuel | B66F 9/0755 340/572.1 |
| 8,582,867 B2 | 11/2013 | Litvak | |
| 8,805,002 B2 | 8/2014 | BenHimane et al. | |
| 8,831,352 B2 | 9/2014 | Gao et al. | |
| 8,836,575 B2 | 9/2014 | Nishiyama | |
| 8,903,430 B2 | 12/2014 | Sands et al. | |
| 9,341,720 B2 | 5/2016 | Garin et al. | |
| 9,342,724 B2 | 5/2016 | McCloskey et al. | |
| 9,357,181 B2 | 5/2016 | Fujimatsu et al. | |
| 9,607,388 B2 | 3/2017 | Lin et al. | |
| 9,626,709 B2 | 4/2017 | Koch et al. | |
| 9,779,286 B2 | 10/2017 | Morishita | |
| 9,875,579 B2 | 1/2018 | Menozzi | |
| 9,946,963 B2 | 4/2018 | Samara et al. | |
| 9,990,733 B2 | 6/2018 | Tsuji | |
| 10,019,693 B2 | 7/2018 | Wolf et al. | |
| 10,019,878 B2 | 7/2018 | Mains, Jr. | |
| 2006/0132311 A1 | 6/2006 | Kruest et al. | |
| 2006/0184013 A1 | 8/2006 | Emanuel et al. | |
| 2008/0226130 A1 | 9/2008 | Kansal et al. | |
| 2011/0121068 A1 | 5/2011 | Emanuel et al. | |
| 2012/0251011 A1 | 10/2012 | Gao et al. | |
| 2013/0050502 A1 | 2/2013 | Saito et al. | |
| 2014/0247278 A1 | 9/2014 | Samara et al. | |
| 2015/0302500 A1 | 10/2015 | Koch et al. | |
| 2016/0110976 A1 | 4/2016 | Mains, Jr. | |
| 2016/0203357 A1 | 7/2016 | Morishita | |
| 2016/0247318 A2 | 8/2016 | Menozzi | |
| 2016/0335780 A1 | 11/2016 | Tsuji | |
| 2017/0014203 A1 | 1/2017 | De Mathelin et al. | |
| 2017/0091704 A1 | 3/2017 | Wolf et al. | |

OTHER PUBLICATIONS

International Application No. PCT/US18/61839—International Search Report and Written Opinion. World Intellectual Property Organization International Search Authority, dated Mar. 7, 2019.

Klimek et al., Color Image Processing and Object Tracking System, NASA Technical Memorandum 107144, Feb. 1996.

\* cited by examiner

SYSTEMS AND METHODS FOR TRACKING ITEMS

This application claims domestic priority to U.S. Provisional Application Nos. 62/588,261 filed on Nov. 17, 2017, and 62/675,772 filed on May 24, 2018, both of which are incorporated herein in their entireties by this reference.

FIELD OF THE INVENTION

The present invention relates to material-handling systems and methods of tracking designated materials or containers, and more particularly to automated systems for tracking the real-time locations of designated materials or containers.

DISCUSSION OF THE BACKGROUND

Many systems exist for tracking items such as packaged goods, shipping containers, warehouse bins and boxes, vehicles, and other items. Conventional tracking systems have their strengths and weaknesses. Automation of such systems is a continuing goal toward which some progress has been made, but there are many improvements to be made to existing tracking systems.

Additionally, various conventional tracking systems have used manned vehicles or automated vehicles for transporting and retrieving the tracked items. Both manned and automated transport vehicles (e.g., motorized pallet jacks, forklift trucks, buggies, and carts) have been used in factories, warehouses, and distribution centers to move tracked items. For example, previously developed shipping container systems have included attempts to attach marks, markers, bugs, radios, GPS equipment, and other devices to shipping containers. However, such systems are flawed in that reading or detecting devices for such markers are often blocked by other objects (e.g., stacked containers) between the container and the reading or detecting device, or for some reason are not accessible. Device incompatibilities also are common because there is no standardization of such devices.

Commodity goods (e.g., nuts, fruits, vegetables, etc.) are typically loosely tracked in lots in the storage and sorting process. Commodity goods are often warehoused in containers (e.g., agricultural bins) and these bins typically are not individually or precisely marked. Consequently, commodity goods from various sources can be intermingled as the storage containers are moved around a warehouse environment. Also, commodity goods are typically sorted by quality and other characteristics, resulting in sorting the containers of goods from different sources into a grouping or lot having a particular common characteristic or set of characteristics. As a result, the individual containers can easily lose their provenance, making it difficult to identify the source of the goods in the containers.

Even if such commodity containers are individually marked, warehousing operations generally do not bother with maintaining precise records and segregation of such containers due to the inefficiency and logistical difficulty of doing so. Once the individual containers are intermingled, the source information for the commodity goods therein is effectively lost. Commodity warehousing and sorting operations do not identify the source of the intermingled containers because it is highly labor intensive and inefficient.

Additionally, goods which are the subject of recalls due to manufacturing or design error or other defect are difficult to trace within a warehouse or other storage situation. Improved tracking systems for such goods are needed as well.

Further, current systems are not designed to track a particular commodity from its source, through intervening storage and sorting locations, all the way to the end user of the product. Such tracking would be useful to both a retailer and the consumer, as well as government agencies tasked with regulating trade of such goods. Agricultural goods can be subject to recalls for contamination and other reasons, and often the recall affects any and all of the goods coming from a supplier in a given date range, requiring all of the supplier's goods to be removed from the market. For example, if there is a bacterial contamination of a particular kind of fruit delivered from a supplier (e.g., a broker or distributor) who receives the fruit from multiple farms, without a system for reliably tracking and segregating the fruit sourced from various farms through the broker and to the final destination where the contamination is discovered, all such fruit that were supplied to the market through the broker or distributor would be recalled indiscriminately. This is a hugely inefficient process that results in massive waste and losses for the supplier and the farms. Systems that facilitate the tracking of commodity goods from the source through the sorting, warehousing, and packaging stages, and to the final wholesale or retail destinations are needed.

Therefore, improved, efficient, and reliable systems for tracking and retrieving individual containers or objects within a storage environment are needed. Such improved systems would facilitate tracking of goods with particularity from source to destination.

SUMMARY OF THE INVENTION

The present invention provides systems and methods for tracking items (e.g., commodities, goods, containers, boxes, packages, etc.) through transportations to multiple locations within a pre-defined space, to allow the position(s) and movement(s) of such items to be accurately tracked and documented, and to allow such items to be quickly identified and located based on tracking records kept within the tracking system. The system may utilize image sensors, image recognition and processes software, position translation software, and a virtual model of the pre-defined space in order to track objects within the defined space and maintain a record of the movement(s) and position(s) of the object within the pre-defined space.

The tracking system of the present invention may track all movements of containers or objects received and stored by the operator of the tracking system. The tracking system may include electronic devices and software operable to execute an automated process for tracking the movement and positions of the containers or objects, such that the tracking system may have a complete or substantially complete history of the movement and locations of the containers or objects that may be recorded in a centralized database. The containers or objects may be moved and positioned in the pre-defined space by manned and/or automated transport vehicles. The transport vehicles may be outfitted with a mobile computing device having one or more image sensors. The tracking system may utilize machine-readable optical markers within the pre-defined space that are used by the automated tracking process to determine the position, orientation, and other movement data of transport vehicles and objects or containers within the pre-defined space. The tracking system may also incorporate other mobile computing devices (e.g., handheld mobile electronic devices) having one or more image sensors for capturing images of the machine-readable optical markers.

The tracking system may utilize image recognition and processing software capable of identifying the machine-readable optical markers in digital images captured by the image sensors of the mobile computing devices. The image recognition and processing software may be stored in computer-readable storage of an image processing host, and the software may be implemented as executable instructions. The image recognition and processing software may calculate the position of the mobile computing device within the pre-defined space by utilizing the machine-readable optical marker(s) having known positions and dimensions. Each of the machine-readable optical markers may have a unique code (e.g., a 2-dimensional code) that identifies the particular marker and its location within the defined space. An image sensor of the tracking system may capture an image of the pre-defined space, and the image may be analyzed for the presence of optical markers in the image using a machine vision process. The appearance of the identified optical marker may be skewed and/or rotated due to the orientation of the optical marker relative to the image sensor. To remove the distortion of the coding on the object marker, the image recognition and processing software may perform an unwarping transformation of the image (e.g., an affine transformation process) to create an optimized plan view of the marker to allow the coding on the optical marker to be read by the image recognition and processing software. The image recognition and processing software may then interpret the matrix coding on the optical marker to identify the particular optical marker and determine its realworld position in the pre-defined space, which may be stored in a database of the tracking system. The image recognition and processing software may use pose estimation calculations to interpret the perceived image of the marker and determine the position the optical marker relative to the image sensor that captured the image, thereby determining a real world location of the image sensor. The foregoing processes may be repeated at intervals to update the tracking systems record of the position of the mobile computing device, allowing the tracking system to track the movement of the mobile-computing device through the predefined space. In some embodiments, the calculations for the location of the mobile computing device may take into account additional data available to the system, such as GPS data, additional machine-readable optical marker data, and/or gyroscopic orientation data collected by the mobile computing device.

Once the tracking system determines the location of the mobile computing device within the pre-defined space, the mobile computing device may act as a reference point for determining the location of objects or containers within the predefined space. For example, the mobile computing device may be mounted on a vehicle for transporting objects or containers into or out of said predefined space, and the vehicle (e.g., a forklift) may have an image sensor (e.g., a camera) mounted such that it captures images of optical markers on one or more objects or containers when the objects or containers are loaded onto said vehicle. At that point the tracking system identifies that the objects or containers will now be transported on the vehicle, and that the position of the mobile computing device represents the position of the objects or containers as well. Once the vehicle arrives at a storage point for the objects or containers, the tracking system may be signaled that the objects or containers will no longer be carried by the vehicle, and that they will remain stationary at the storage point (e.g., the lowering of the forklift tines may automatically signal that the objects or containers are being stored, or the storage point is pre-determined in the tracking system and when the vehicle reaches the storage point, the tracking system records data that the objects or containers are present and stationary at the predetermined storage point).

In other examples, the mobile computing device may capture images of optical markers on objects or containers (object markers) within the predefined space as the mobile computing device is moving through the predefined space and analyze the images of the optical markers to determine the position and identity of the object or container. The image recognition and processing software is operable to analyze optical features within each object marker the images to determine an orientation of the object marker relative to the image acquisition device by performing an unwarping process to compensate for skew in the view of the object marker provided by the image and generate a plan view of the object marker. The image recognition and processing software may then analyze optical features within the plan view of the object marker to read coding provided in the coding of the object marker and retrieve identification data from the coding. The image processing system may then compare the identification data to records of the object markers in the tracking system stored in a machine-readable memory to identify a matching record for the object marker being analyzed and retrieve location data for the object marker from a record stored in the machine-readable memory for the object marker. The image recognition and processing software may further perform a pose estimation calculation that includes calculating rotation and translation vectors for the object marker relative to the mobile computing device based on the optical features of the object marker to determine orientation of the object marker relative to the mobile computing device and the relative positions of the mobile computing device and the object marker. The image recognition and processing software may then determine the location of the object marker (and the container or object on which it is positioned) in the pre-defined space by determining the position of the mobile computing device within the predefined space as described herein, setting the mobile computing device as an xyz origin within a coordinate system, and using the pose estimation calculation for the object marker to determine the rotation of the object marker from the perspective of the mobile computing device and a perceived size of the object marker in the image to determine the distance from the xyz origin of the mobile computing device. If the determined location of the object marker within the predefined space is inconsistent with the record for the object marker, the record for the object marker may be updated with the current position of the object marker. The record for the object marker may include identification data for the object or container on which it is positioned, as described herein.

The image processing host may also include position translation software stored in its computer-readable storage, which is operable to translate the real world position of an object or container in the pre-defined space into a position within a digital model of the pre-defined space. The computer-generated model of the pre-defined space may be a two-dimensional (e.g., a two-dimensional map of the floor space of the pre-defined space) or a three-dimensional virtual model of the pre-defined space. In such embodiments, and without limitation, the tracking system may also incorporate data into the digital model regarding physical structures in the pre-defined space (e.g., vertical beams, walls, doorways, ramps, elevation changes, shelving and storage structures, low clearance areas, and other physical features), such that the computer-generated model is as close a copy to the actual pre-defined space as possible. The computer-generated model may be stored in a computer-readable storage of the tracking system and may be accessible to an image processing host (e.g., a mobile computing device). For example, the computer-generated model may be stored in computer-readable memory of mobile computing devices integrated into the tracking system and/or a central computer or server with which all mobile computing devices in the tracking system are connected. The image processing host may utilize the position translation software to generate and record virtual copies of each of the containers or objects with a virtual location within the computer-generated model that accurately reflects the real-world location of the container or object in the pre-defined space. In the case of a two-dimensional map, the virtual location of the object or container may include a "pin-point" location within the map, identifying its x-y location, and additional data may be stored in the database record for the object or container regarding (1) whether the object or container is found in a stack of objects or containers and its position in that stack, (2) the height of the position of the container, (3) whether the container is positioned on a structure (e.g., a rack or scaffolding), and other pertinent data. The additional data may assist in locating the object or container in a densely packed area of the pre-defined space. In the case of a three-dimensional virtual model of the pre-defined space, the objects or containers may themselves have virtual models (including their height, width, and depth dimensions) that are stored within the virtual model, such that the x, y, and z location of the objects or containers within the pre-defined space are known.

The image processing host may be a mobile computing device on which the image recognition and processing software and the position translation software are stored. The mobile computing device may include a user interface (e.g., a touchscreen), at least one image sensor, a processing unit (e.g., a microprocessor), an operating system, computer readable memory, a wireless communication device (e.g., a radio frequency (RF) capable device) to enable wireless communication with other wireless-enabled electronic devices, and other components. The processing unit may be operable to execute the image recognition and processing software, the position translation software, and other software stored in the computer readable memory of the mobile computing device.

The tracking system may include a plurality of mobile computing devices that are each operable to function as image processing hosts and share the data it generates with the other mobile computing devices through a network hosted by the tracking system. One or more databases may be stored in the memory of each mobile computing device, including a database providing the locations and unique code data for each machine-readable optical marker utilized in the tracking system; the computer-generated model of the pre-defined space; data regarding the position of each container or object within the pre-defined space; data regarding the contents, source, date of first storage, and other relevant information regarding the objects or containers stored in the pre-defined space; and data regarding identification and authentication information for the mobile computing device for interacting with other mobile computing devices and components of the tracking system. Data generated by a mobile computing device regarding a particular object or container within the pre-defined space may be immediately shared with the other mobile computing devices through a network node. The network node may be a general purpose computer or server that includes a user interface (e.g., a touchscreen, or a keyboard, mouse and monitor, etc.), a processing unit (e.g., a microprocessor), an operating system, computer readable memory, a wireless communication device (e.g., a radio frequency (RF) capable device) to enable wireless communication with the mobile computing devices and other wireless-enabled electronic devices, and other components. The network node may be programmed with network hosting software for receiving wireless data from mobile computing devices within the network of the tracking system. The network hosting software on the network node may be operable to identify and authenticate each of the mobile computing devices in the tracking system using identification numbers and/or authentication keys assigned to each mobile computing device included in the tracking system. The mobile computing devices may be operable to transmit and receive data from the network node via radio channel, WiFi, Bluetooth, WLAN, WiMax, 3G/4G cellular radios, and/or other wireless data communication connections.

The network node may also include databases (e.g., back-up or master centralized database) that mirror the one or more databases of the mobile computing devices, including a database providing the locations and unique code data for each machine-readable optical marker utilized in the tracking system; the computer-generated model of the pre-defined space; data regarding the position of each container or object within the pre-defined space; data regarding the contents, source, date of first storage, and other relevant information regarding the objects or containers stored in the pre-defined space; and identification and authentication information for the mobile computing devices for interacting with other mobile computing devices and components of the tracking system. The databases stored on the network node may allow for loading data onto a mobile computing device to be added to the network (or a mobile computing device that has crashed), and provide a backup for data security.

In alternative embodiments, the network node may act as the image processing host. In such embodiments, the mobile computing device may simply capture optical image data from the cameras regarding nearby machine-readable optical markers and optionally other data captured by the mobile computing device such as GPS satellite navigation receiver solutions, inertial navigation data, etc., and transmit the images and other data to the network node. The network node may be programmed with the image recognition and processing software and the position translation software, and may execute these programs to determine the position, orientation, and other movement data for transport vehicles or other mobile computing devices and the objects or containers within the pre-defined space. The data output resulting from the execution of the software may then be stored in the databases on the memory of the network node.

In some embodiments, the network node may simply be a wireless communication device (e.g., a radio frequency (RF) capable device) to enable wireless communication with the mobile computing devices and other wireless-enabled electronic devices, and other components, such as a WiFi network hub. In such embodiments, the software of the tracking system may be loaded onto the mobile computing devices along with the databases described herein. In such embodiments, the mobile computing devices may communicate and exchange wireless data amongst themselves through said network node. The network hosting software may be included in the tracking system software loaded onto the mobile computing devices, allowing the mobile computing devices to execute the network hosting software to identify and authenticate each of the mobile computing devices in the tracking system using identification numbers and/or authentication keys assigned to each mobile computing device included in the tracking system.

The machine-readable optical markers of the tracking system may include optical markers placed in a static position within the pre-defined space (static markers) and markers positioned on movable objects and/or containers stored within the pre-defined space (object markers). The static markers serve as spatial reference points and may be located at various static points within the pre-defined space. In some embodiments, and without limitation, the markers may be located on the ceiling or other elevated areas to avoid or reduce obstruction of the markers by other objects in the defined space, such as stacked containers, large vertical objects (e.g., large vertical posts or pillars) shelving, and other potential obstructive objects. The system may also include static markers in other locations, such as on lower portions of pillars that may line or be in proximity to pathways through the pre-defined space, on floor surfaces along pathways through the pre-defined space, and other useful locations that may allow for unobstructed views of the static markers.

The object markers may provide dual functions, (1) giving each object or container an individual identification marker, allowing an image processing host to identify the objects or containers and their position within the pre-defined space, and (2) providing additional reference points in the pre-defined space to allow an image processing host to determine its position within the pre-defined space. With regard to function (1), the position of the objects and/or containers in the pre-defined space may be recorded and saved in the tracking system database when they are brought into the pre-defined space. The object markers may be identified by a mobile computing device positioned on a manned or automated transport vehicle (e.g., forklift) that transports the object or container into the pre-defined space, or after the object or container has been stored in the pre-defined space. For example, a human operator may use a mobile computing device to scan the object marker of an object or container after it has been placed in a storage area within the pre-defined space. Once an object marker is identified and the storage location for the object or container is reached, the position of the particular object or container may be recorded in tracking system database. Once an object or container is identified and its position is recorded in the tracking system database, the object marker on the object or container may, in some embodiments, be used by mobile computing devices moving through the pre-defined space as a reference point (in addition to the static markers) to help identify the location of the mobile computing device, since the position of the object or container is known by the tracking system. The image processing host may also identify, verify, and update the position of an individual object or container within the pre-defined space as the image processing host moves through the pre-defined space. For example, a user may be moving through the pre-defined space with a mobile computing device to identify and record positions of objects or containers that have been recently moved into the pre-defined space. Also, the mobile computing device may capture images of object markers of containers and objects already present in the pre-defined space, and the image processing host may identify the position of the object marker and its position and compare its position with the position data stored in the tracking system database. If the position is consistent with the database record, the record is verified, if the position differs from the database record, the database record will be updated.

The coding for the machine-readable optical markers may be specifically sized and designed to be perceivable to a digital camera or other image sensor at distance. For example, the marker coding may be a 2-dimensional matrix code having sufficient size to be perceived with sufficient resolution to be accurately read by the optical receiver at distance in a range of up to about 100 feet (e.g., at a distance of about 10 feet to about 100 feet, at a distance of about 10 feet to about 75 feet, at a distance of about 10 feet to about 50 feet, or at a distance of about 10 feet to about 30 feet). The size and design of the coding on the marker may allow the optical receivers of the system to perceive and sufficiently identify the data on the markers when they are positioned on the ceiling, other elevated or distant structures within the defined space, or otherwise at distance, and they are oriented at oblique angles relative to an image sensor. Such markers may allow the system to work within an environment that includes barriers and obstacles on the floor thereof, and stacked and positioned above the floor level such as a warehouse having many large stacks of containers that could interfere with RFID and other conventional tracking systems. In large environments, QR codes cannot be used due to the size and design of QR codes, which cannot be effectively read by standard image sensors (e.g., a camera of a mobile phone or tablet) at distances of more than about 5 feet. Additionally, the size and design of QR codes make them ineffective for interpreting the pose of the marker at such distances.

The matrix code may have a minimum size to allow image sensors of the tracking system to accurately capture the coding present on the optical marker. The optical markers may have various designs, but must be in a machine-readable form and must be designed such that the tracking system is able to determine the pose and orientation of the machine-readable markers based on the image of the markers captured by the image sensors of the mobile computing devices from a multitude of different positions within the pre-defined space. In some examples, the coding section of the marker may have an area of at least 20 in.$^2$. The tracking system may use various kinds of matrix codes on the optical markers, e.g., ECC 200, or customized matrix code formats. In some embodiments, the matrix code may have a rectangular shape (e.g., square or substantially square shape). The matrix code may include unique geometric features (optical features) in the coding of the marker, such as a designated orientation guide (e.g., a designated section of the matrix code in a corner and/or other position within the matrix code), a data section having a machine-recognizable pattern, quiet zones within the matrix code (e.g., zones that are a single color with no variation that frame coding areas within the matrix code) and one or more other features that aid in allowing the tracking system to identify the optical marker (e.g., a border in high contrast to the background of the optical marker). An example matrix code is provided in the image in FIG. 2.

The number of cells in the matrix code may be limited for purposes of resolution and image recognition, and for efficient computing. The pre-defined space may be a large warehouse that may have space sufficient to house up to hundreds of thousands of containers and/or objects. Thus, bit number of the matrix code must be sufficient to accommodate hundreds of thousands of containers. There are also the countervailing concerns of (1) keeping the size of the cells within the matrix code sufficiently large to have sufficient resolution for identification at large distances and oblique angles relative to the image sensor, and (2) the number of calculations that must be performed in order to identify the particular matrix code—multiple matrix codes may be processed simultaneously and feedback data (e.g., about the location of a transport vehicle, such as a forklift based on the captured images of the matrix codes in the area of the forklift) must be provided quickly in real time as a transport vehicle (e.g., a forklift) is in motion. Thus, it is advantageous to keep the bit number of the matrix codes relatively low.

In some embodiments, the static markers and object markers may have different matrix code designs. For example, the static markers may utilize a matrix code of 100 bits or less (e.g., 36 bits or less) to allow for relatively large cells in order to allow for readability at distance, while the object markers may include a matrix code of greater than 100 bits to allow for a greater number of possible unique codes, thereby allowing the tracking system to track a larger number of objects and/or containers. In such embodiments, the tracking system may segregate the location analysis for determining the position of a mobile computing device within the pre-defined space from the process of identifying and recording the position of the objects or containers. In such embodiments, the lower bit number matrix codes (100 bits or less) may be used for the static markers, and higher bit number matrix codes (greater than 100 bits) may be used for the object markers. The use of the lower bit number matrix codes for the static markers may facilitate easier reading and tracking of the location and movement of a mobile computing device within the pre-defined space.

The Hamming distance of the matrix codes may also be utilized to improve the identification of the individual matrix codes on the optical markers. The matrix codes are to be read at significant distances and at various skews and angles. Therefore, the image recognition software of the tracking system may make intermittent errors in interpreting the matrix codes, resulting in bit flips that corrupt the matrix code. To provide a correction means for such errors, the matrix codes may have Hamming distances sufficient to correct errors in reading the matrix codes. Each of the matrix codes may be sufficiently different from the other matrix codes in the tracking system such that a small number of errors made by the image recognition software in reading a matrix code will not result in misidentifying the matrix code. The matrix codes may be 128 bits or less (e.g., 36 bits) and may have a Hamming distance in a range of 6 to 20. These limitations on the possible unique codes can be adjusted to optimize readability of the matrix codes based on the maximum distance at which they would be read. For example, larger maximum distances (e.g., for static matrix codes) would call for a lower number of bits (e.g., 12-24 bits) and a Hamming distance of about 6 to 12. Higher bit numbers and Hamming distances may be used for the object matrix codes, to allow for a higher number of matrix codes to accommodate more containers or objects. In one example, the object marker code may be 63 bits, 24 of which store data, with a minimum Hamming distance of 15, which provides $2^{24}$ unique object markers with a matrix code to be at least 15 bits away from the matrix code of any other object marker and allows correction of up to 7 bit flips by the image recognition software.

The machine-readable optical markers may be constructed from any material on which the coding may be directly printed or otherwise applied. The machine-readable optical markers may be mechanically sturdy such that the machine-readable optical marker does not physically breakdown and the coding data thereon is not compromised by deterioration. Various materials may be used for the markers, such as sealed paperboard, plastic sheeting, cardboard, metal, and other common materials. The material may be opaque and the color may be in high contrast to the color of the coding to be printed or applied to the machine-readable optical marker, such that the coding may be easily read by an image sensor. In some examples, the applied coding may be on a retro-reflective material to improve the contrast of the coding and thus the signal-to-noise ratio and the quality of the signal output from the image sensor. In other examples, the machine-readable optical markers can be imprinted directly on planar or substantially planar structures within the pre-defined space (e.g., ceilings, walls, pillars, beams, etc.) using stenciling and/or other methods.

In some embodiments, data may also be printed in human language on the static markers (e.g., outside of the boundary of the matrix code). Such human language data may include identification codes, coordinate/location data, and other information. This printed text may allow a human operator to determine an approximate location within the pre-defined space by simply viewing and reading the text on the nearest static marker.

The image sensors used to capture the images of the optical markers may be digital cameras suitable for symbol imaging purposes having a light sensitive image sensing array of the CCD, CMOS or other available and suitable type. The image sensors are connected to and in electronic communication with the mobile computing device(s). For example, the image sensors may be built-in cameras on the mobile computing devices (e.g., smartphones, tablets, or onboard computers in the vehicles for transporting the objects or containers). In some embodiments, the image sensors may be mounted on a transport vehicle (e.g., a forklift) and may be mounted such that it faces in an upward direction to locate the positions of the static markers (e.g., on a ceiling, upper wall area, or other elevated structure of a defined space). In some embodiments, the vehicles may be automated, and may include cameras facing forward, back, left, and right to monitor the surroundings, and provide enough image data to track the movement of the vehicle in real-time without significant processing delays.

In some embodiments, the tracking system may include a plurality of image sensors combined in an array of image sensors arranged such that they cover a hemispheric or substantially hemispheric view of the pre-defined space. In such embodiments, the mounting point of each image sensor on a vehicle and the orientation of each image sensor (e.g., the angle of the image sensor's focal axis relative to the mounting point on the vehicle) may be known and encoded into image recognition and processing software of the tracking system. The orientation of each image sensor relative to the vehicle is thus encoded and known, and therefore the relative position of the optical markers in the images captured by the image sensors can be calculated. In such embodiments, the image sensor array may capture images of both static markers and object markers, and the image recognition and processing software may analyze the captured images of both the static and object markers in determining the position of the vehicle. The image recognition and processing software may also identify the position of the object markers in the pre-defined space to verify or update the position of objects or containers associated with the object markers in the tracking system database, as discussed above.

Vehicles incorporated into the tracking system may also have one or more image sensors facing in forward and/or lateral directions in order to read the object markers on the objects and/or containers in the pre-defined space. In some embodiments, a forward facing camera may be mounted in a front of the transport vehicles (e.g., forklifts) to enable image capture of containers or objects to be transported by the vehicle before or as they are loaded such that the object markers thereon may be analyzed for identification information and the movement and/or storage of the containers or objects may be logged in a record for the corresponding object markers. Additional image sensors may be provided facing upward, facing in each lateral direction, and/or facing behind the transport vehicle to improve tracking by capturing more optical marker data for use in the image recognition and processing software's calculation of the vehicle's position, thereby improving accuracy.

The data in the optical markers captured by the image sensors may be used by the image processing host to determine the position of a vehicle or person based on the orientation and known location of the static marker(s) and/or the object marker(s) as perceived by the image sensors. More specifically, the image recognition and processing software analyzes an image for the presence of optical markers therein, analyzes the orientation of the optical marker relative to the mobile computing device that captured the image, identifies the data provided on such optical markers and identifies the real-world location of the marker based on the data, calculates the location of a mobile computing device relative to the machine-readable optical markers based on the real-world location of the optical markers, and translates that relative location to a defined real-world location within the pre-defined space. The position translation software is operable to translate the real-world location of the mobile computing device into a virtual location within a computer-generated model (e.g., 2D or 3D virtual model) of the pre-defined space stored in a memory of the tracking system. Once the real-world position of the mobile computing device is translated to a corresponding position in the computer-generated model of the pre-defined space, the position of the mobile computing device can be recorded in a memory of the tracking system. The movement of the mobile computing device through the pre-defined space may then be tracked through the pre-defined space in real time. The tracking system can thus provide real-time and continuous tracking of objects and/or containers within the pre-defined space (e.g., a warehouse or other location having containers or objects stored therein) through the automated image recognition and analysis and position translation methods.

The real-time continuous tracking may also facilitate the automated, unmanned operation of transport vehicle. With a computer-generated virtual model of the pre-defined space that includes representations of the containers and objects and the other physical structures (e.g., vertical posts, pillars, shelving, and other potential obstructive objects) within the pre-defined space, the routes of the automated vehicles may be determined by navigation process software (described below) and the automated vehicle may be directed to move to a location, pick up one or more objects or containers, and move the objects or containers to a second location by the navigation process software.

The image recognition and processing software and the position translation software may be loaded and stored in computer-readable storage of an image processing host and implemented as executable instructions. The image recognition and processing software may adjust captured images for readability, determine the presence or absence of one or more machine-readable optical markers in a captured image (based on marker shape and reference and coding features), and analyze the matrix code on the optical markers. Machine-readable optical markers detected in a captured image are first identified as optical markers, the image thereof is then adjusted and optimized for readability and orientation through a pose estimation process. Each image of an optical marker is then analyzed for the identity of the machine-readable optical marker to allow the image recognition and processing software to either determine the location of the optical markers by looking up the corresponding pre-determined location of the optical marker stored in a memory of the image processing host (in some embodiments, the matrix code will provide an identification code within the matrix code that allows the image processing host to look up the physical position of the optical marker based on the identification code), or from data encoded in the matrix code of the optical marker (in some embodiments the physical location will be encoded into the matrix code). The relative position of the optical marker to the image sensor can then be determined based on the orientation and known location of the optical marker in the pre-defined space.

The optical marker may first be identified as an optical marker by virtue of one or more features that aid in allowing the image recognition software to identify the optical marker. For example, the optical maker may include a border in high contrast to the background of the optical marker that defines the machine-readable area and the length and width of the matrix code. Once the optical marker has been identified as an optical marker, the image recognition and processing software may identify a designated orientation guide, such as a section of the matrix code in a corner (e.g., an upper left corner) and/or other pre-determined position within the matrix code that is asymmetric with respect to both left to right (x axis) and top to bottom (y axis) of the optical marker to allow the image recognition and processing software to identify the orientation of the optical marker relative to the image sensor that captured the image.

In some embodiments, the image recognition and processing software may include a machine vision software module that utilizes a machine learning process and artificial intelligence. The machine vision software may be configured to identify the optical features of the optical markers. In particular embodiments, the software may analyze an image for shapes and edges typical of the features of a matrix code of an optical marker. In particular embodiments, the system is configured to recognize an orientation guide (e.g., a designated section of the matrix code in a corner and/or other position within the matrix code), a data section having a machine-recognizable pattern, including distinct geometric shapes with hard edges (e.g., a grid of light and dark rectangles or other geometric shapes), quiet zones within the matrix code (e.g., zones that are a single color with no variation that frame coding areas within the matrix code) and one or more other features that aid in allowing the tracking system to identify the optical marker (e.g., a border in high contrast to the background of the optical marker). In various embodiments, the machine vision software module may utilize a learning algorithm to intelligently learn and improve its ability to recognize optical features of the matrix codes. The machine vision software module may include convolutional neural networks that are trained to recognize coarse and subtle characteristics of the matrix codes in an image. The system may be programed using deep machine learning-based multi-layer convolutional neural networks. The convolutional neural network may be trained using large libraries of images that include matrix codes like those of the present invention. The system may, for example, use data points derived from user confirmation or correction of portions of photographs identified matrix codes to improve future identification of matrix codes by using the new data points. The machine vision software module may, for example, store information associated with the matrix code such as a relative position, size, and/or shape of the orientation guide, the data section, quiet zones within the matrix code, and other features of the matrix code and associate that information with the particular matrix code that was confirmed by the user as having that matrix code pattern.

The training process for the artificial neural network may include network parameters that govern how the artificial neural network operates. The training steps may include receiving a training image; scanning the training image (e.g., scanning each of a plurality of sub-regions in a grid pattern of a pre-determined size) to obtain respective sub-region pixel sets; inputting the sub-region pixel sets into the convoluted neural network so that the convoluted neural network provides output values; comparing the output values to corresponding teacher image pixel values to determine whether there are errors; and training the network parameters of the artificial neural network to reduce the error. These steps may be repeated with multiple training images to improve the accuracy of the image analysis performed by the neural network. The training phase may include machine learning methods in which the machine vision software analyzes training images from an archive set and the rules and heuristics of the software and incrementally adjusted through iteration to ultimately yield a predictive model for matrix codes that yields accurate analyses.

Once the neural network is sufficiently trained, the machine vision software may run in real-time or near real-time and generate a real-time or near real-time identification of the optical markers within an image. The identified optical markers within the image may be highlighted or otherwise identified to enable the image recognition and processing software can perform pose estimation calculations on each of the optical markers in the image and compare the adjusted image to records of the optical markers within the predefined stored on a computer-readable memory of the system.

Once the optical marker is identified in an image, the image recognition and processing software may determine that the appearance of the identified optical marker is skewed and/or rotated due to the orientation of the optical marker relative to the image sensor. To remove the distortion of the coding on the object marker, the image recognition and processing software may perform an unwarping transformation of the image (e.g., an affine transformation process) to create an optimized plan view of the marker to allow the coding on the optical marker to be read by the image recognition and processing software. The unwarping transformation may include identifying shapes within the object marker having specific number of corners (e.g., four-cornered objects) and applying an unwarping transformation of each such shape to recreate a rectangular or square shape in order to generate a rectified image and an estimated plan view of the object marker. The image recognition may then identify the orientation guide in the matrix coding to the allow the image recognition and processing software to properly parse and read the coding on the object marker (i.e., placing the coding data in the proper order) and extract identification data therefrom that allows the image recognition and processing software to locate a record for the object marker in the tracking system database.

Once the orientation guide has been identified, the image recognition and processing software may perform a pose estimation operation to identify the manner in which the image of the optical marker is rotated and/or twisted in the image due to the relative orientation of the optical marker to the image sensor. Since the geometry (size and shape) of the optical marker is known, and the pose can be determined based on the position of the orientation guide within the captured image of the optical marker, and the known geometry of the matrix code contained within the rotated and/or twisted image of the optical marker can be digitally interpreted by a pose estimation process. The pose estimation process may utilize a set of control points on the object, such as the corners of the high contrast border and the orientation marker, and a set of calculations to translate the perceived 2-dimensional code pattern to correspond to points of a two-dimensional plan view image of the optical marker. The pose estimation counters the estimated rotation and twist in the perceived 2-dimensional code pattern in the captured image to generate an estimated and optimized plan view of the optical marker. The following diagram below illustrates the pose estimation process.

The pose estimation process compares the known size and shape of a matrix code with the projected image of the object the matrix code in order to get an accurate estimate of that objects pose with respect to the imaging sensor. The image recognition and processing software determines the translation and rotation vectors necessary to transform the perceived pose of the matrix code to a plan view. These rotation and translation vector values can then be inverted in order to find the pose of the camera relative to the object. The pose estimation process performed by the image recognition and processing software includes the following steps:

1. Identify the object in the image as an optical marker by one or more features that aid in allowing the image recognition software to identify the optical marker (e.g., a high contrast border, the orientation guide, the checkered pattern of the matrix code, etc.);
2. Perform an unwarping transformation of the image (e.g., an affine transformation process) to (a) rectify the image of the optical marker to remove distortion of the coding thereon resulting from skew and/or rotation due to the orientation of the optical marker relative to the image sensor and (b) create an estimated plan view of the marker to allow the coding on the optical marker to be read by the image recognition and processing software;
3. Identify the orientation of the coding in the estimated plan view of the optical marker in the image by locating and the orientation guide as a reference point for reading the coding, and reading the coding on the optical marker once the proper orientation is known;
4. Find the known set of control points in the image (e.g., the corners of a matrix code);
5. Compare the differences between the control points of the optical marker in the image and the control points as they would be present in a plan view of the optical marker (e.g., a plan view of a matrix code) in order to produce two vectors, the translation and rotation vectors.
6. Using the translation and rotation vectors and an estimated distance of the optical marker from the mobile computing device to determine the location of the camera of the mobile computing device within the predefined space.

A visual representation of the transformation using the translation and rotation vectors is provided in FIG. 3 using control points 1-4.

The pose estimation process can be used in conjunction with a close estimate of the distance of the optical marker from the image sensor determined by the image recognition and processing software by comparing the size of the image of the optical marker and the known size of the optical markers of the tracking system. The size ratio between the image of the optical marker and the known size of the optical markers can be used in the process of calculating the real world position of the image sensor, as discussed below. In some examples, the ratio of the of the known size of the optical marker to the number of pixels occupied by the marker may provide a close measure of the distance between the image sensor and the optical marker based, e.g., on a pre-determined table of ratios of pixel number to distance.

The identity of the optical marker can be determined by analyzing the data provided in the matrix code. The image recognition and processing software may be programmed to recognize the broken columns and rows of the matrix code in the data section, which may be a pre-determined number of "cells" that may be filled with a dark color (e.g., black) or a light color (e.g., white). Each matrix code may have a unique pattern of dark and light cells within the matrix code, allowing each optical marker to be uniquely identified. Data encoding is accomplished by assigning dark cells to represent binary "1" and light cells to represent binary "0", or vice versa. Contrasting colors other than black and white may also be utilized as long as the imaging device and computer software can differentiate between light and dark cells. Once identified and located within the captured image, the optical marker coding is analyzed and the position of the particular optical marker can be identified by varying methods In some embodiments, the identity of the optical marker can be determined by reading the unique matrix code of the perceived optical and searching data records for the optical markers (static or object markers) that are present in the pre-defined space, which may be stored (e.g., as a look up table) in a memory of the image recognition and processing host and may be available for retrieval. The retrieval location data saved in a record for the particular matrix code allows the image recognition and processing software to identify the perceived optical marker by matching the coding in the data section of the perceived marker to corresponding identification data in the stored records for the optical markers. In other embodiments, the matrix code of static markers may include real-world coordinates for its position within the pre-defined space. In such embodiments, the real-world position of the static marker may be determined by the image recognition and processing software by interpreting the matrix code data without reference to a database.

Once the real-world location of the optical marker is identified, and the orientation of the marker relative to the image sensor is known, the image recognition and processing software may transform the positions of the image sensor and the optical marker to treat the optical marker as an origin in a three-dimensional coordinate system as shown in FIG. 4.

The coordinate system may be aligned with the static marker (e.g., where the x-axis is parallel with the lateral sides of the marker, as shown in the diagram) such that the coordinate systems of two or more markers are normalized and may be coordinated with a grid pattern of static markers within the pre-defined space. The real-world position of the image sensor within the pre-defined space can be found by first estimating the pose of the image sensor with respect to the optical marker using the rotation and translation vectors previously calculated for transforming the matrix code of the optical marker. With the static marker established as the origin and point of reference, the image recognition and processing software may estimate the real world position of the image sensor within the pre-defined space using (1) a calculation relative position of the image sensor to the optical maker within the pre-defined space based on (a) the rotational and translation vectors and (b) the size of the perceived image of the optical marker, and (2) the known position of the optical marker, including the height of the optical marker's position within the pre-defined space. As a result, the image recognition and processing software provides a real-world location for the image sensor and the associated mobile computing device within the pre-defined space.

Other data may also be taken into account in calculations of the real-world position of the image sensor. For example, the identity of the image sensor that captured the image being analyzed and the associated height position of the image sensor may be encoded into the image recognition and processing software and taken into account in the calculations for determining the real world position of the image sensor, thereby providing a more accurate calculation. Additionally, multiple position markers may be within the captured image, including static markers and/or object markers. The steps of identifying the location of the particular machine-readable optical marker, and the relative position, distance, and orientation of the optical marker may be performed for each optical marker identified in the captured image. The output data resulting from the identification, pose estimation, and transformation calculations for each marker may then be utilized to refine the estimate of the position of the image sensor through an averaging calculation, plane geometry (e.g., taking into account two optical markers and the their respective distances from the image sensor), or other techniques, e.g., the x coordinates for each calculated position of mobile computing device can be averaged, and the y coordinates for each calculated position of mobile computing device can be separately averaged. However, it is to be understood that the present tracking system is operable to determine a position of a mobile computing device using only one optical marker in the predefined space.

The following steps provide an exemplary process for determining the location of the mobile computing device within the pre-defined space:

a. The image recognition and processing software analyzes the image data captured by an image sensor for the presence of optical markers (static markers and/or object markers) and identifies optical markers present in the image data in sufficient resolution;

b. Perform an unwarping transformation of the image to (a) rectify the image of the optical marker to remove distortion of the coding thereon resulting from skew and/or rotation due to the orientation of the optical marker relative to the image sensor and (b) create an estimated plan view of the marker to allow the coding on the optical marker to be read by the image recognition and processing software;

c. Identify the orientation of the coding in the estimated plan view of the optical marker in the image by locating and the orientation guide as a reference point for reading the coding, and reading the coding on the optical marker once the proper orientation is known;

d. The image recognition and processing software determines the real-world position of the optical marker within the pre-defined space based on the data in a corresponding record for the optical marker stored in a database of the tracking system;

e. The image recognition and processing software performs a pose estimation process;

f. The image recognition and processing software determines the real world position of the mobile computing device in the pre-defined space by:
  1. Transforming the positions of the mobile computing device and the optical marker, such that position of the optical marker is used as an origin of a three-dimensional coordinate system, and
  2. Calculating the position and orientation of the mobile computing device within the pre-defined space based on the known position of the optical marker (including a known height), the rotation and translation vectors, an estimated distance between the optical marker and the mobile computing device based on the number of pixels occupied by the optical marker in the captured image, and other data (e.g., a known or estimated height of the mobile computing device, etc.),
  3. In some implementations, step 2 is repeated for each of the optical markers in the captured images to provide multiple calculations of the real-world position of the mobile computing device, which may then be averaged by the image recognition and processing software to provide a precise estimate of the location.

The real world position data output from the image recognition and processing software may then be used by position translation software to translate the position and orientation of the image sensor and the mobile computing device to a position within the digital model of the pre-defined space stored in a memory of the image processing host, thereby locating a virtual copy of the vehicle or mobile computing device from which the image was captured within the computer-generated model of the pre-defined space.

Once the position of the mobile computing device is translated into a virtual position within a computer-generated model (a 2 dimensional or 3 dimensional map) of the pre-defined space (e.g., as within a virtual environment), the movement of the mobile computing device can be accurately tracked and recorded in a seamless real-time manner by the tracking system. The image recognition and location analysis routines may be repeated to track the movement of the vehicle or mobile computing device through the pre-defined space and create a digital record of such movement. The image sensor(s) of the mobile computing device may continuously or at intervals (e.g., at an interval length in a range of about 0.01 to about 1 second) capture and send images of optical markers in the defined space to the image processing host, which performs the following steps each time it receives a new image: (1) identifying the optical markers in each image, (2) analyzing the matrix code data within the optical marker to calculate the pose estimation and identify the particular marker location within the pre-defined space, (3) transforming the positions of the image sensor and the optical marker to treat the known position of the optical marker as the origin and determine the real world location of the image sensor, (4) translating the actual physical position of the mobile computing device to a virtual position within the computer-generated model, and (5) recording the position within the computer-generated model in a memory of the image processing host. In this manner, the movement of a mobile computing device through the pre-defined space can be tracked and recorded with precision.

The ability to track mobile computing devices (and vehicles with which they may be paired) allows the tracking system to track and record the movement and position of containers and objects that are moved through the pre-defined space. A container or object may be identified by a unique identification number that is encoded into the matrix code of the object marker attached to the container or object. In alternative embodiments, the container may include a simple identification means, such as a bar code. The movement and location of the container or object may be tracked by (1) first identifying the container or object by manual input of the identification code and/or scanning or capturing an image of the matrix code to allow the image processing host to identify the specific container or object, (2) moving the container or object through the pre-defined space in conjunction with a mobile computing device (e.g., on a transport vehicles or other tool equipped with such a mobile computing device), and (3) tracking the movement and location of the mobile computing device through the pre-defined space and recording such movement and location in a memory of the image processing host. The movement and position data of the mobile computing device may be recorded as the movement and position of the associated container or object that was moved in conjunction with the mobile computing device. Once the container or object reaches its destination (e.g., a storage location in a warehouse), the image processing host may record such location as "stored position" for the particular container or object in a memory.

The system may also be able to monitor and track the positions of containers that are already within the pre-defined space. The object markers of many of the objects or containers within the pre-defined space may be perceivable by the image sensor(s) of a mobile computing device present in the pre-defined space, whether they be mounted on a vehicle or carried by a person. In some examples, objects or containers may be moved into the pre-defined space with a vehicle or other device or means that does not include a mobile computing device. In such examples, a human operator may use a mobile computing device incorporated into the tracking system to identify the objects or containers after they have been positioned and stored in the pre-defined space. The mobile computing device may be used to deliberately capture images of the object markers on the objects or containers, identify their real-world locations within the pre-defined space, translate their positions into virtual positions within the computer-generated model of the pre-defined space, and record the positions in the tracking system database.

Also, mobile computing devices moving through the pre-defined space may capture images and the image recognition and processing software may identify any markers that are captured within the image, including any unobscured object markers present in the image in sufficient resolution. The image recognition and processing software and the position translation software may then process the data from the marker image and calculate the position of the objects or containers relative to the position of the mobile computing device within the pre-defined space to (1) aid in determining the current position of the mobile computing device, and/or (2) provide an updated position for the object or container within the pre-defined space. In such embodiments, the ability of the mobile computing devices to detect the locations of objects or containers having markers perceivable from the mobile computing device may allow for additional data in determining the position of the mobile computing device and for verification and updates of the locations of the objects and containers within the pre-defined space.

The location of objects or containers within the pre-defined space and captured in images by a mobile computing device may be determined through the following exemplary process:

a. The image sensor captures an image of an object marker on a container or object.
b. The image recognition and processing software analyzes the image data for the presence of an optical marker, locates any object markers in the image;
c. The image recognition and processing software performs an unwarping process to remove distortion from the coding on the object marker;
d. The image recognition and processing software then analyzes the features of the matrix code data on the object marker identified in the image data to determine identification data in the coding and retrieves a record for the object marker from a database of the tracking system;
e. The image recognition and processing software performs a pose estimation process to determine rotation and translation vectors based on the perceived image of the object marker;
f. The image recognition and processing software determines the real world position of the object marker in the pre-defined space by calculating the position and orientation of the object marker within the pre-defined space based on the known position of the mobile computing device (the known position of the mobile computing device may be used an xyz origin for a coordinate system in the calculations), the rotation and translation vectors for the object marker, an estimated distance between the optical marker and the mobile computing device based on the number of pixels occupied by the optical marker in the captured image, and other data (e.g., a known or estimated height of the mobile computing device, etc.);
g. The database record for the object marker may also be updated using identifying information in the object marker coding;
  1. If the location has been previously recorded, the image recognition and processing software compares the position of the object or container calculated by the image recognition and processing software to the recorded position of the object or container,
    a) If the calculated position and the recorded position match, the location is confirmed,
    b) If the calculated position and the recorded position do not match, the location record of the object and/or a virtual location of the object or container is updated in the computer-generated model of the pre-defined space;
  2. If the location has not been recorded, the image recognition and translation software records a location of the object or container in the corresponding record in a database of the tracking system and/or the position translation software creates a computer-generated model of the pre-defined space.

The tracking system may include a database for storing records associated with each container or object received in which the location data for each object or container is stored, and a history of the movement of the object or container through the pre-defined space, e.g., time and date information correlated to all movements and positions of the particular container or object may be recorded in a database of the tracking system. The date and time data may be provided by clock and calendar software within the image processing host. The tracking system may also include additional data in the record for a given object or container, such as data regarding the material inside the container (e.g., agricultural goods, such as fruits, nuts, vegetables, etc.) or a description of the object (e.g., a television of a particular model), which may be included in the record of the container or object, allowing a human operator to determine content of the container or identity of the object. In some implementations, source data may be included in the record for the particular container or object that indicates where the container or object came from. For example, the source data may indicate the farm from which the agricultural goods (e.g., fruit, nuts, etc.) contained in a particular container came. In some implementations, data regarding a particular lot or batch of the goods in the particular container or the lot or batch of the particular object may be included in the record for the particular container or object that indicates the source of the goods and the additional data such as the time of harvesting (in the case of agricultural goods), the time of manufacture (for manufactured goods), the particularized source of the goods (e.g., a particular field and time of harvest for agricultural goods, a particular factory and the particular maker/assembler of a manufactured good, etc.), the chain of custody of the goods, the method and route of shipping of the goods, the method of handling of the goods prior to delivery of the goods to the handler using the tracking system of the present invention (e.g., temperature at which the goods were kept, whether the goods were washed, whether the goods were exposed to the elements and for how long, etc.), and/or other data relevant to the lot or batch of the particular kind of goods. Additional forms of data may be further included in the record of the particular container or object.

The additional forms of data may be used as search parameters for a lookup process provided by the tracking system that has access to the position records for the object and containers in the pre-defined space. A human operator may search the records of the containers or objects stored in the pre-defined space using a user interface of a mobile computing device or other computing device incorporated into the tracking system to input query data into a lookup process software program provided on the mobile computing device or other computing device. The human operator may input query data including, but not limited to, the identification number of the particular container or object, the date of delivery of container(s) or object(s), the lot or batch number of container(s) or object(s), the source of container(s) or object(s), kind of goods contained in the container(s) or the kind of the object(s), and/or other query data that is included in the record of one or more container(s) or object(s) that have been recorded in a memory of the tracking system. For example, lookup process software operable to access the container and object records stored in the memory of the tracking system may be present on the mobile computing devices.

The lookup process software may allow a human operator to locate one or more containers or objects based on chosen queries. For example, if a source of goods finds that a particular lot or batch of goods is contaminated or in some way flawed (e.g., a farm indicates that agricultural products of a particular batch are suspected to be contaminated with a pathogen), the human operator can look up all containers or objects that are included in the particular lot or batch by searching for the lot or batch number through the lookup process software. The human operator may also search records in the memory of the tracking system, e.g., based on the date containers (or goods in containers) or objects were delivered, the kind of goods in the containers or the kind of objects, the source of the containers (or goods in containers) or objects, and other data based on the specific purpose for identifying the containers (or goods in containers) or objects.

The tracking system of the present invention may also provide instructions for finding particular container(s) or object(s) that are stored in the pre-defined space. The instructions may be provided as a part of the output data provided by the lookup process software in response to a query. The output data may be provided on a display screen of a mobile computing device (e.g., carried by a human operator or installed on a transport vehicle), including a list of the data contained in the record of the particular container(s) or object(s) (e.g., the identification number(s) of the containers or objects, source data, delivery date and time data, lot or batch data, identity of goods data, etc.), and a map of the pre-defined space with one or more location identifiers (e.g., pins or points) that identify the location of the container(s) or object(s).

In some embodiments, and without limitation, the directions may be provided as a graphic display over images captured by a mobile computing device. The lookup process software may provide the human operator the option to receive directions as graphics overlaid on real-time image output provided to the screen display of the mobile computing device from an image sensor of the mobile computing device. This process provides a viewfinder display on the mobile computing device. In the case of a transport vehicle, the directions supplied to the display screen of the mobile computing device may be used to retrieve the container(s) or object(s) and transport them as desired. In such processes, the location of the retrieved container(s) or object(s) may be tracked from the stored location from which it is retrieved to its new location, whether it be a new location within the pre-defined space, a different storage space, or a hauling vehicle (e.g., a train, tractor trailer, or other hauling vehicle) to allow the tracking system to have a complete record for each container(s) or object(s) that arrives and leaves the pre-defined space and associated facilities.

The lookup process software may have a subroutine that provides the images captured by the image sensor(s) of the mobile computing device to the image recognition and processing software, which identifies the optical markers in the images captured by the one or more image sensors of the mobile computing device, and determines the position and orientation (rotational orientation or heading) of the mobile computing device through the processes described herein. Once the image processing host has identified the actual position of the mobile computing device in the pre-defined space and translated the position to a virtual position within the computer-generated model of the pre-defined space, the image processing host can calculate the most efficient route to the container(s) or object(s) through a navigation processing software operable to create a route based on the virtual position of the mobile computing device and the virtual destination(s) of the container(s) or object(s).

The navigation processing software may use a point-to-point shortest path technique between the location of the mobile computing device (the starting point) and the identified container(s) or object(s) (the end point(s)) taking into account obstacles within the pre-defined space, including the virtual copies of each of the containers or objects in the pre-defined space, and other physical structures, such as vertical beams, walls, doorways, ramps, elevation changes, shelving and storage structures, low clearance areas, and other physical features) that are also incorporated into the computer-generated model, as discussed above. In such embodiments, and without limitation, once the starting and endpoints are specified, navigation processing software may then calculate one or more route options taking into account the obstacles modeled within the computer-generated model of the pre-defined space, wherein the navigation processing software is constrained to form routes that do not intersect any physical object represented in the computer-generated model, and the route must not pass between two physical objects that are separated by less than a pre-determined distance (e.g., the approximate width of a forklift) in order to allow for comfortable passage through the pre-defined space.

Once the one or more routes are calculated, the navigation processing software may be operable to select the route of the shortest distance for output to the mobile computing device as a route presented with a map on the display screen of the mobile computing device or as graphics overlaid on a real-time image output provided to the screen display of the mobile computing device from an image sensor of the mobile computing device. The navigation processing software may generate a graphical path that overlays images captured from an image sensor of the mobile computing device on display screen of the mobile computing device. The graphics may include straight, curvilinear, and bent arrows that show the direction of travel toward the container(s) or object(s). The graphics may also include outlining or other graphic indicators to identify the specifically sought container(s) or object(s) within the image displayed on the display screen of the mobile computing device. A human operator can visually follow the graphic indicators to the desired containers or objects.

The above-described lookup process for providing directions may be carried out in the same general manner to allow a human operator to identify a source, lot, or other identifying information for goods that may have been housed in a container that was or is housed in the pre-defined space. The detailed records for each container(s) or object(s) that arrives and leaves the pre-defined space and associated facilities provided by the tracking system of the present invention allow for human operators to trace handling of the container(s) (and goods therein) and object(s) without gaps in the record. Such a precise and detailed database allows, e.g., goods housed in the containers to be traced back through their routes of delivery to their ultimate source. The detailed records are highly useful in situations in which goods (e.g., agricultural goods) are found to be contaminated or otherwise faulty. The detailed records of the present tracking system may allow for more accurate identification of the source of contamination or flaw, and may thereby reduce the volume of goods that need to be recalled from the marketplace as a result of such contamination or flaw. This may significantly improve economic efficiency and reduce the costs incurred by businesses that are required to recall goods.

In some embodiments, the tracking system may include a geo-fencing functionality that prevents objects or containers from being removed from the pre-defined space if they are not scheduled to be removed. In some embodiments, the image recognition and processing software may include an exit authentication protocol that checks a scheduled exit log stored in a memory of the image processing host. The exit log may include all objects or containers designated to be transported out of the pre-defined space and the date on which they are scheduled to leave, and optionally other data, such as the vehicle or other transportation mechanism on which they are scheduled to leave, the intended recipient of the object or container, etc. In other examples, the data regarding whether an object or container is scheduled to be removed from the pre-defined space may be stored in the database record for the object or container. If a vehicle is moving an object or container that is not identified in the exit log, and the image processing host tracks the transport vehicle carrying the object or container to within a predetermined proximity of a point of egress from the pre-defined space, the image processing host may send an alert to the mobile computing device on the transport vehicle notifying the operator of the vehicle that it is transporting one or more objects or containers that should not be removed from the pre-defined space. In the case of an automated transport vehicle, the image processing software may simply send a command to the transport vehicle to stop and/or return the objects or containers to their storage location within the pre-defined space. The tracking system may also include special image sensors near the points of egress for the pre-defined space (e.g., at an exit gate) that capture images of the object markers as they pass through the exit gate. The image sensors may be in electronic communication with an image processing host and may analyze the images of the object markers and look up the records for the object markers and check the exit log to determine whether the object or container is designated to be removed from the predetermined space. If the object or container is designated to leave, no action is taken; but, if not, the image processing host may send a signal to an alarm (e.g., flashing lights, audible sirens, and/or other devices) positioned at the exit gate and/or other positions in the pre-defined space to alert the operator moving the objects or containers that the objects or containers should not be removed from the pre-defined space.

It is to be appreciated that embodiments of the invention may be adapted for use in a variety of different inventory environments, including not only industrial or agricultural warehouses, but also retail stores. For example, markers may be provided in the ceiling of a retail store that can be read by the camera of a customer's mobile device. An application program on the mobile device can use the camera to read the marker to determine the position of the mobile device, and thereafter respond to queries by the user to direct the user to specific locations in the store where selected items may be found. The tracking system of the present invention may also be used for long term storage facilities for hazardous materials, allowing the contents and the movements of containers stored in the facility (e.g., an underground facility) to be recorded and closely tracked.

There are additional uses for the general design of the system, broadly covering a system for identifying a position of a mobile sensor/computer combination (e.g., a mobile computing device, a vehicle with a mobile computing device mounted thereon) within an enclosed environment and then tracking the movement of the position of mobile sensor/computing device and recording and storing the movement of the mobile sensor/computer in a system memory. The system first establishes and tracks the position of the mobile sensor/computer by (1) receiving image data from the mobile sensor/computer of a marker (e.g., matrix code) within the enclosed environment, (2) computing the position of the mobile sensor/computer by pose estimation calculations based on the perceived image of the marker and the known position and dimensions of the marker, and (3) orienting and defining the position of the mobile sensor/computer within a computer-generated model (a 2 dimensional or 3 dimensional map) of the enclosed environment (e.g., as within a virtual environment). Once the system has oriented the position of the mobile computing device, the movement of the mobile computing device can be accurately tracked and recorded in the memory. The system can then locate, track and record the positions of marked inventory units within the environment.

In some aspects, the present invention relates to a system for tracking the position of objects within a predefined space, comprising a plurality of unique static markers, each comprising a machine-readable code, arranged in predetermined locations within the predefined space; a plurality of unique object markers positioned on each of the objects; an electronic image acquisition device (e.g., a mobile computing device) having a machine vision system, the machine vision system comprising an image sensor and image capture electronics, for acquiring images of the unique static markers and the object markers; and an image processing system (e.g., image recognition and processing software) for analyzing pixels in the acquired image to determine an identity of each static marker and object marker in the acquired image, retrieve location data from a database for each static marker in the acquired image, and determining a position of each static marker and each object marker relative to the image acquisition device. In some embodiments, the system may include a machine-readable memory for storing a digital model of the predefined space, positions of the static markers, positions of the object markers, and identification data regarding the objects. The image processing system may be operable to determine a position of the image acquisition device within the predefined space. The image acquisition device may be movable through the predefined space and is operable to acquire images of the predefined space at regular intervals. The image processing system may be operable to analyze each of the images to identify each static marker and object marker therein, retrieve the location data from the database regarding a position of each the static marker and each the object marker within the predefined space, and provide an updated location of the image acquisition device based on the position of the image acquisition device relative to a position of one or more of the static markers in the image. The image processing system may be operable to determine a location of the image acquisition device based on the position of the image acquisition device relative to a position of a single static marker in the image. In some embodiments, the system may include a plurality of image acquisition devices. In some embodiments, the system may include a wireless data communication network for transmitting data between the image acquisition devices.

The image processing system may be operable to determine orientation of each the static marker relative to the image acquisition device by performing an unwarping process to compensate for skew in a view of the static marker provided in the image and generate a plan view of the static marker. The image processing system may be operable to analyze optical features within the plan view of the static marker to read coding provided in the optical features and retrieve identification data from the coding. The image processing system may be operable to compare the identification data to records of each of the plurality of static markers stored in the machine-readable memory to identify a matching record for the static marker and retrieve location data of the static marker from a record for the static marker. The image processing system may be operable to perform a pose estimation calculation that includes calculating rotation and translation vectors based on the optical features of the static marker to determine the position and orientation of the image acquisition device relative to the static marker. The image processing system may be operable to calculate the position and orientation of the image acquisition device within the predefined space based on the retrieved location data of the static marker, the pose estimation calculation for the static marker, and an estimation of the distance of the static marker from the image acquisition device based on a size of the static marker in the image. The image processing system may be operable to analyze optical features within each the object marker in the image to determine an orientation of the object marker relative to the image acquisition device by performing an unwarping process to compensate for skew in a view of the object marker provided in the image and generate a plan view of the object marker. The image processing system may be operable to analyze optical features within the plan view of the object marker to read coding provided in the optical features and retrieve identification data from the coding. The image processing system may be operable to compare the identification data to records of each of the plurality of object markers stored in the machine-readable memory to identify a matching record for the object marker and retrieve location data of the object marker from a record for the object marker. The image processing system may be operable to perform a pose estimation calculation that includes calculating rotation and translation vectors based on the optical features of the object marker to determine orientation of the object marker relative to the image acquisition device and the relative positions of the image acquisition device and the object marker. The image processing system may be operable to determine the location of the object marker in the predefined space based on the pose estimation calculation for the object marker, a known position of the image acquisition device within the predefined space, and a perceived size of the object marker in the image. The image acquisition device may be set as xyz origin within a coordinate system in the step of determining the location of the object marker in the predefined space. The image processing system may be operable to update the location data for the object to be consistent with the location of the object in the predefined space if location data of the object marker does not match the location of the object marker in the predefined space. The image processing system may be operable to analyze optical features within each static marker and each object marker to determine orientation of each of the static markers and object markers relative to the image acquisition device, performing a pose estimation calculation for each of the static markers and object markers in the image based on the optical features within each the marker. The pose estimation calculation may include calculating rotation and translation vectors for each of the static markers and object markers based on the optical features to generate to determine a relative position of the static markers and the object markers relative to the image acquisition device. A digital model of the predefined space stored in the computer-readable memory, wherein the digital model includes digital records of the plurality of static markers and their corresponding positions. The image processing system may be operable to determine a relative position of the image acquisition device to the static marker by: translating the positions of the image acquisition device and the static marker such that the static marker is set as xyz origin within a coordinate system of the digital model of the predefined space; calculating the position and orientation of the image acquisition device within the predefined space based on location data of at least one of the static markers retrieved from the database, the pose estimation calculation for the at least one static marker, and an estimation of the distance of the static marker from the image acquisition device based on a size of the static marker in the image.

The system may include a position translation system operable to translate the position and orientation of the image acquisition device into a digital representation of the image acquisition device in the digital model of the predefined space. The image processing system may be operable to determine a relative position of the image acquisition device to a plurality of static markers by determining the position and orientation of the image acquisition device relative to that of a first static marker by performing a pose estimation calculation, calculating the position and orientation of the image acquisition device relative to the predefined space based on a location data of the first static marker retrieved from the database, a pose estimation calculation for the first static marker, and an estimation of the distance of the first static marker from the image acquisition device based on a size of the first static marker in the image, determining the position and orientation of the image acquisition device relative to that of a second static marker by performing a pose estimation calculation, calculating the position and orientation of the image acquisition device relative to the predefined space based on a location data of the second static marker retrieved from the database, a pose estimation calculation for the second static marker, and an estimation of the distance of the second static marker from the image acquisition device based on a size of the second static marker in the image, and performing an averaging calculation to provide multiple calculations of the position of the image acquisition device to provide an averaged estimate of the location.

The system may include an intake point through which each of the plurality of objects is passed before the objects enter the predefined space, wherein the intake point includes at least one image acquisition device for taking an image of an object marker on the object, identifying the object marker, and generating a record of the presence of the object within the predefined space to be stored in the machine-readable memory. The system may include an egress point through which each of the plurality of objects is passed before it leaves the predefined space, wherein the egress point includes at least one image acquisition device for taking an image of an object marker on the object, identifying the object marker, and generating a record of the removal of the object from the predefined space to be stored in the machine-readable memory. The predefined space includes a warehouse and the digital model includes a digital representation of the warehouse. The predefined space may include a warehouse and the digital model includes a digital representation of the warehouse, including digital representations of physical features within the warehouse. The physical features may include structures selected from the group consisting of pillars, crossbeams, ramps, steps, walls, doorways, light fixtures, shelving structures, and rack structures.

The system may include a lookup software system operable to identify a location an object stored within the predefined space when data relating to the object is entered into a lookup software query. The data relating to the object may be selected from the group consisting of contents of the object, source of the object, date of entry of the object into the predefined space, and destination of the object. The system may include a navigation processing software system operable to provide directions to the location an object identified and located by the lookup software through the image acquisition device. The image acquisition device may be a mobile computing device having a graphical display. The navigation processing software may calculate directions to the object identified and located by the lookup software using the position of the image acquisition device as determined by the image processing system, and the last recorded position of the object identified and located by the lookup software. The navigation processing software may further use the digital representations of the physical features in the warehouse in calculating directions. The navigation processing software may provide the directions to the object identified and located by the lookup software to the graphical display. The directions may be in the form of a graphical overlay over real time images provided to the graphical display by the camera of the image acquisition system. The image acquisition device may be positioned on a vehicle for moving the objects.

In another aspect, the present invention relates to a method for tracking and retrieving an object in a predefined space that includes placing a plurality of unique static markers, each comprising a machine-readable code, in the predefined space arranged in predetermined locations; creating a database stored on a machine-readable memory, the database including records for each of the static markers, each of the records including location data of the corresponding static marker in the predefined space; placing a unique object marker on each of a plurality of objects to be positioned in the predefined space; generating a record for each object marker in the database that includes identification data of the object marker and data regarding the object on which it is positioned; placing the object in a storage position in the predefined space; and recording the storage position in the record for the object marker positioned on the object. The step of recording of the storage position of the object may include capturing a digital image of the object marker using an electronic image acquisition device, the image acquisition device having a machine vision system that includes an image sensor and image capture electronics, and an image processing system operable to analyze an image to identify static markers and object markers present in the image. The method may include capturing an image of at least one static marker with the image acquisition device and analyzing optical features within the at least one static marker with the image processing system to determine orientation of the at least one static marker relative to the image acquisition device by performing a unwarping process to compensate for skew in a view of the at least one static marker provided in the image and generate a plan view of the at least one static marker. The method may include analyzing the optical features within the plan view of the static marker to read coding provided in the optical features and retrieve identification data from the coding. The method may include comparing the identification data to the records of each of the static markers stored in the machine-readable memory to identify a matching record for the static marker and retrieve location data of the static marker from a record for the static marker. The method may include performing a pose estimation calculation that includes calculating rotation and translation vectors based on the optical features of the static marker to determine the position and orientation of the image acquisition device relative to the static marker such that the static marker is set as xyz origin within a coordinate system. The method may include calculating the position and orientation of the image acquisition device within the predefined space based on the retrieved location data of the static marker, the pose estimation calculation for the static marker, and an estimation of the distance of the static marker from the image acquisition device based on a size of the static marker in the image. The method may include translating the position and orientation of the image acquisition device into a digital representation of the image acquisition device in a digital model of the predefined space. The step of recording of the storage position of the object may include using the image processing system to determine a position of the object within the predefined space based on the determined position of the image acquisition device, a pose estimation for an object marker positioned on the object, and an estimation of the distance of the object marker from the image acquisition device based on a size of the object marker in the image. The step of recording of the storage position of the object further comprises performing an unwarping process to compensate for skew in a view of the object marker provided in the image and generate a plan view of the object marker using the image processing system. The method may include analyzing optical features within the plan view of the object marker to read coding provided in the optical features and retrieve identification data from the coding using the image processing system. The method may include comparing the identification data to records of each of the plurality of object markers stored in the machine-readable memory to identify a matching record for the object marker and retrieve location data of the object marker from a record for the object marker using the image processing system. The method include performing a pose estimation calculation that includes calculating rotation and translation vectors based on the optical features of the object marker to determine orientation of the object marker relative to the image acquisition device and the relative positions of the image acquisition device and the object marker. The method may include determining the location of the object marker in the predefined space based on the pose estimation calculation for the object marker, a known position of the image acquisition device within the predefined space, and a perceived size of the object marker in the image, wherein the image acquisition device is set as xyz origin within a coordinate system in the step of determining the location of the object marker in the predefined space. The image acquisition device may be set as xyz origin within a coordinate system of the digital model of the predefined space in the step of determining the location of the object marker in the predefined space. The method may include creating an object digital model of the object and positioning the object digital model in a virtual position in the digital model of the predefined space that corresponds to the location of the object in the predefined space. The matching record may include a last recorded position of the object. The method may include comparing the position of the object to the last recorded position of the object to determine whether the last recorded position is consistent with the position of the object, and to update the last recorded position of the the object to be consistent with the position of the object if it is not. The method may include identifying a location of an object stored within the predefined space by entering data relating to the object into a lookup software system query. The data relating to the object is selected from the group consisting of contents of the object, source of the object, date of entry of the object into the predefined space, and destination of the object. The method may include providing directions through the image acquisition device to the location of the object identified and located by the lookup software. The image acquisition device is a mobile computing device having a graphical display. A navigation processing software calculates directions to the object identified and located by the lookup software using the position of the image acquisition device as determined by the image processing system, and the last recorded position of the object identified and located by the lookup software. The method may include generating a digital model of the predefined space.

In another aspect, the invention relates to a method of determining a location of an image acquisition device in a predefined space, comprising providing a plurality of unique static markers arranged at predetermined positional locations within the predefined space, the predetermined positions being recorded in a machine-readable memory and digitally represented in a digital model of the predefined space; capturing an image of a portion of the predefined space using the image acquisition device, the image including at least one of the static markers; determining a location of the image acquisition device within the predefined space, including the steps of: performing image analysis using an image processing system to identify the at least one static marker in the image; identifying the position of the at least one static marker using the image analysis system to analyze optical features on the at least one static marker and comparing the optical features to records of the plurality of unique static markers stored in the machine-readable memory to locate a matching record that includes data regarding a location of the at least one static marker within the predefined space; and using the image processing software to translate the position and orientation of the image acquisition device and the known position of the static marker to identify a position of the image acquisition device in the predefined space. Identifying the position of the at least one static marker may include the image processing system analyzing the optical features within the at least one static marker to determine the orientation of the static marker relative to the image acquisition device, performing a pose estimation calculation based on the optical features within the static marker. The pose estimation calculation may include calculating rotation and translation vectors based on the optical features of the object marker to generate an estimated plan view image of the object marker. The method may include comparing identification data from the optical features to records of the plurality of unique static markers stored in the machine-readable memory to identify the static marker and determine a position of the static marker. Determining a location of the image acquisition device may include the image processing system translating the positions of the image acquisition device and the static marker such that the static marker is set as xyz origin within a coordinate system of the digital model of the predefined space; calculating the position and orientation of the image acquisition device within the predefined space based on the position of the at least one static marker, a pose estimation calculation for the at least one static marker, and an estimation of the distance of the static marker from the image acquisition device based on a size of the static marker in the image. The method may include generating a digital representation of the image acquisition device in the digital model of the predefined space using a position translation system, the digital representation positioned in the digital model in the predefined space such that the location in the digital model corresponds to the real-world position of the image acquisition device in the predefined space. The may include tracking the position and orientation of the image acquisition device through the predefined space by updating the position of the digital model of the image acquisition device at a regular interval by performing the steps of: capturing an additional image of an additional portion of the predefined space using the image acquisition device, the additional image including at least one of the static markers and determining the location of the image acquisition device within the predefined space after the regular interval.

In still another aspect, the present invention relates to a method for logging the movement of an object through a predefined space, comprising placing a unique object marker on the object, the object marker having machine-readable optical features that correlate the object marker with a data record stored in a machine-readable memory; entering data regarding the contents of the object and an initial location of the object in the predefined space into the data record; creating a digital representation of the object within a digital model of the predefined space; and updating the location of the object through a machine vision object location protocol utilizing a plurality of static markers located in the predefined space at predetermined locations, wherein a record of each of the plurality of static markers is stored in the machine-readable memory and a digital representation of each of the plurality of static markers is included in the digital model of the predefined space. The machine vision object location protocol may includes capturing an image of a portion of the predefined space using an image acquisition device, the image including at least one of the static markers; performing image analysis using an image processing system to identify the at least one static marker in the image; identifying the position of the at least one static marker using the image processing system to analyze optical features on the at least one static marker and compare identification data encoded in the optical features to the records of the plurality of static markers stored in the machine-readable memory to locate a matching record, wherein the record includes data regarding a location of the static marker within the predefined space using an image processing system to translate the positions of the image acquisition device and the static marker such that the static marker is set as xyz origin within a coordinate system of the digital model of the predefined space; calculating the position and orientation of the image acquisition device within the predefined space based on the determined position of at least one of the static markers, a pose estimation calculation for the at least one static marker, and an estimation of the distance of the static marker from the image acquisition device based on a size of the static marker in the image; and generating a digital representation of the image acquisition device in the digital model of the predefined space having a position and orientation in the digital model of the predefined space that closely corresponds to the position and orientation of the image acquisition device in the predefined space. The machine vision object location protocol may further includes recording a position of the image acquisition device as a location of the object. The image acquisition device may be in mechanical communication with a vehicle moving the object through the predefined space. The machine vision object location protocol further may include capturing an image of a portion of the predefined space in which the object is located using the image acquisition device; performing image analysis using an image processing and analysis system, the image analysis being operable to identify any object markers in the image, and identifying the object marker; and identifying a data record of the object marker using the image processing system to analyze optical features on the object marker and comparing identification data encoded in the optical features to data records of a plurality of object markers stored in the machine-readable memory to locate a matching record, wherein the data record includes data regarding an identity of the object and a last known position of the digital representation of the object within the digital model of the predefined space. The machine vision object location protocol may further include determining a position of the object within the predefined space, including the steps of performing a pose estimation calculation based on the optical features within the object marker, the pose estimation calculation including calculating rotation and translation vectors based on the optical features of the object marker, and calculating the position of the object using the pose estimation for an object marker positioned on the object, and an estimation of the distance of the object marker from the image acquisition device based on a size of the object marker in the image. The machine vision object location protocol may further include comparing the position of the object to the last recorded position of the object in the object record to determine whether the last recorded position is consistent with the position of the object, and updating the last recorded position of the the object to be consistent with the position of the object if it is not.

In a still further aspect, the present invention relates to a quality control method for automated detection of container contents, comprising placing a unique object marker on each of a plurality of containers, each of the containers comprising a particular product; passing each of the plurality of containers through a quality control station, the quality control station comprises at least one electronic image acquisition device having a machine vision system, the machine vision system comprising an image sensor and image capture electronics, the at least one electronic image acquisition device being in electronic communication with a processor and the processor being in electronic communication with a computer-readable memory; capturing at least one image of the container using the image acquisition device; using an image processing system for analyzing pixels in the at least one image to identify the object marker within the at least one image; and using the image processing system to analyze optical features in the object marker and comparing identification data encoded in the optical features to database records stored in the computer-readable memory to identify an electronic record of the object marker including an identity of the product in the container, the database records including electronic data for a plurality of unique object markers. The method may include entering acceptable product parameters into a quality control software module executable by the processor. The quality control software module may compare the identity of the product to the acceptable product parameters. The processor may activate an alert when the quality control software module finds that the identity of the product is inconsistent with the acceptable product parameters. The alert may include an electronic message to a mobile computing device to alert a human operator of the quality control station. The alert may include information sufficient to identify the container. The alert may include a visual or audible alarm to alert a human operator of the presence of the container including an inappropriate product. Analyzing optical features within the object marker may include performing an unwarping process based on the optical features within the object marker. The unwarping process may provide a rectified plan view of the object marker. The method may include generating an rectified version of the optical feature data of the object marker based on the unwarping process, and reading coding provided in the optical features from the rectified plan view of the object marker, comparing the identification data to database records stored in the computer-readable memory to retrieve data regarding the contents of the container or object.

It is an objective of the present invention to provide improved systems and methods for object location using position markers for determining the position of an electronic device or vehicle with better accuracy and reliability.

It is a further objective of the present invention to provide improved systems and methods for object location that avoids the problems of position marker obstruction by providing a system that can generate and provide real time location data for both the user and the stored objects or containers within a pre-defined space, greatly improving the efficiency of locating and tracking items within a pre-defined space, like a warehouse.

It is a further objective of the present invention to provide improved systems and methods for object location using a reliable and efficient optical markers and automated position determination techniques for vehicles within the predefined coordinate space.

It is a further objective of the present invention to provide improved systems and methods for object location using a predefined coordinate space for tracking objects and providing real-world location instructions for retrieving objects.

Additional aspects and objects of the invention will be apparent from the detailed descriptions and the claims herein.

DETAILED DESCRIPTION OF THE EXEMPLARY EMBODIMENTS

Reference will now be made in detail to certain embodiments of the invention, examples of which are illustrated in the accompanying drawings. While the invention will be described in reference to these embodiments, it will be understood that they are not intended to limit the invention. Conversely, the invention is intended to cover alternatives, modifications, and equivalents that are included within the scope of the invention as defined by the claims. In the following disclosure, specific details are given as a way to provide a thorough understanding of the invention. However, it will be apparent to one skilled in the art that the present invention may be practiced without these specific details.

Figure 1A:
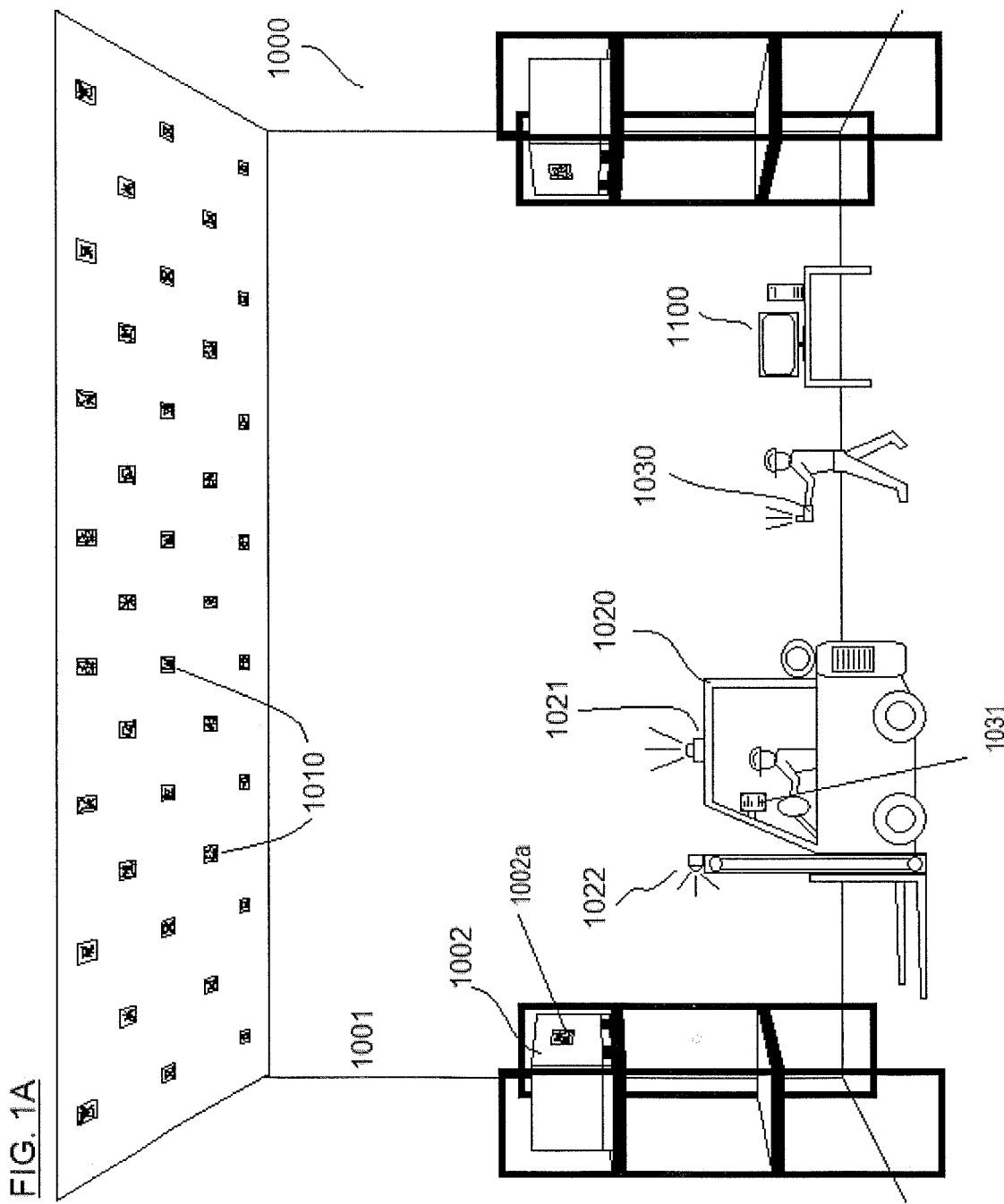
FIG. 1A provides a view of the image tracking system and method according to an embodiment of the invention.
Figure 1B:
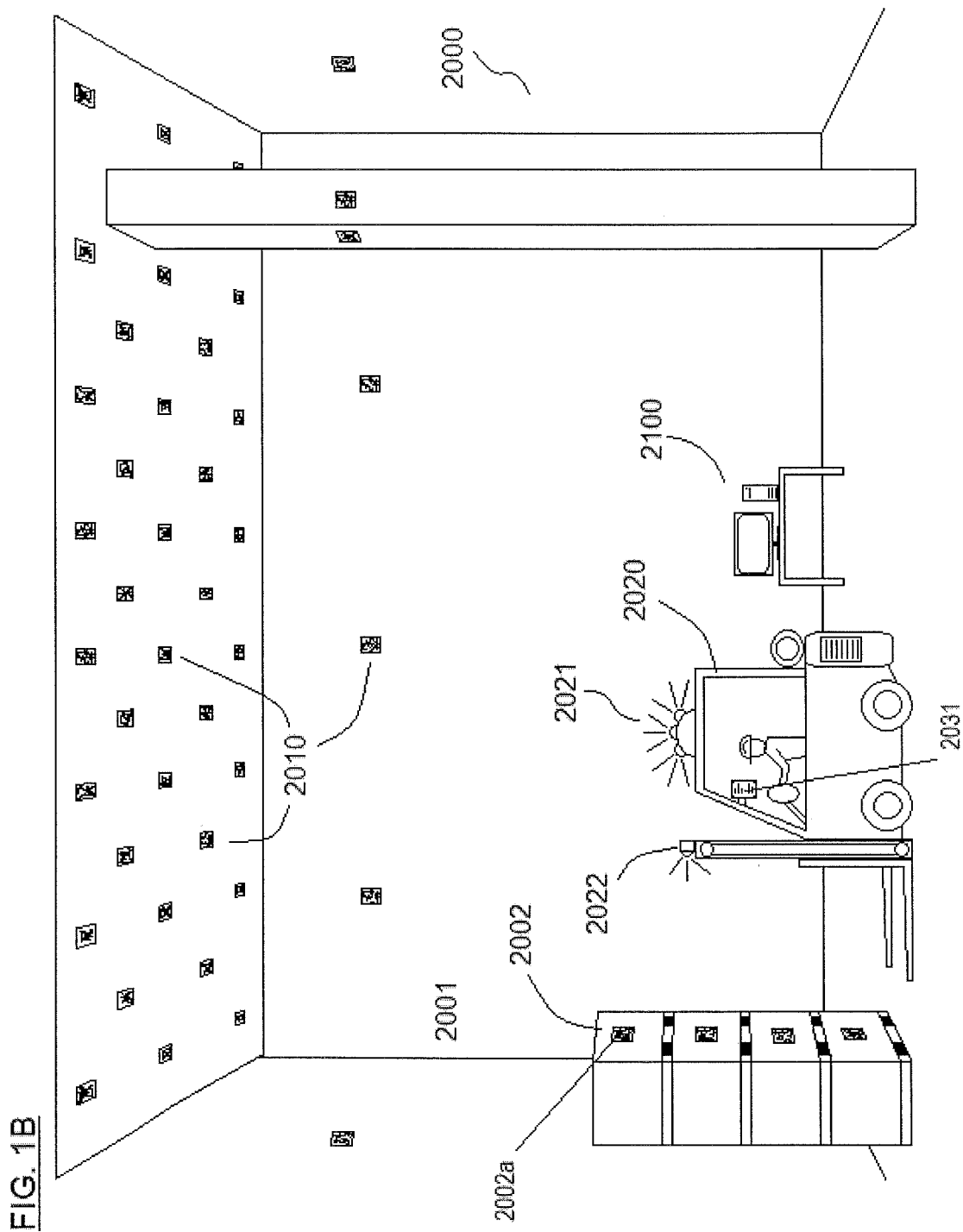
FIG. 1B provides a view of the image tracking system and method according to an embodiment of the invention.
Figure 1C:
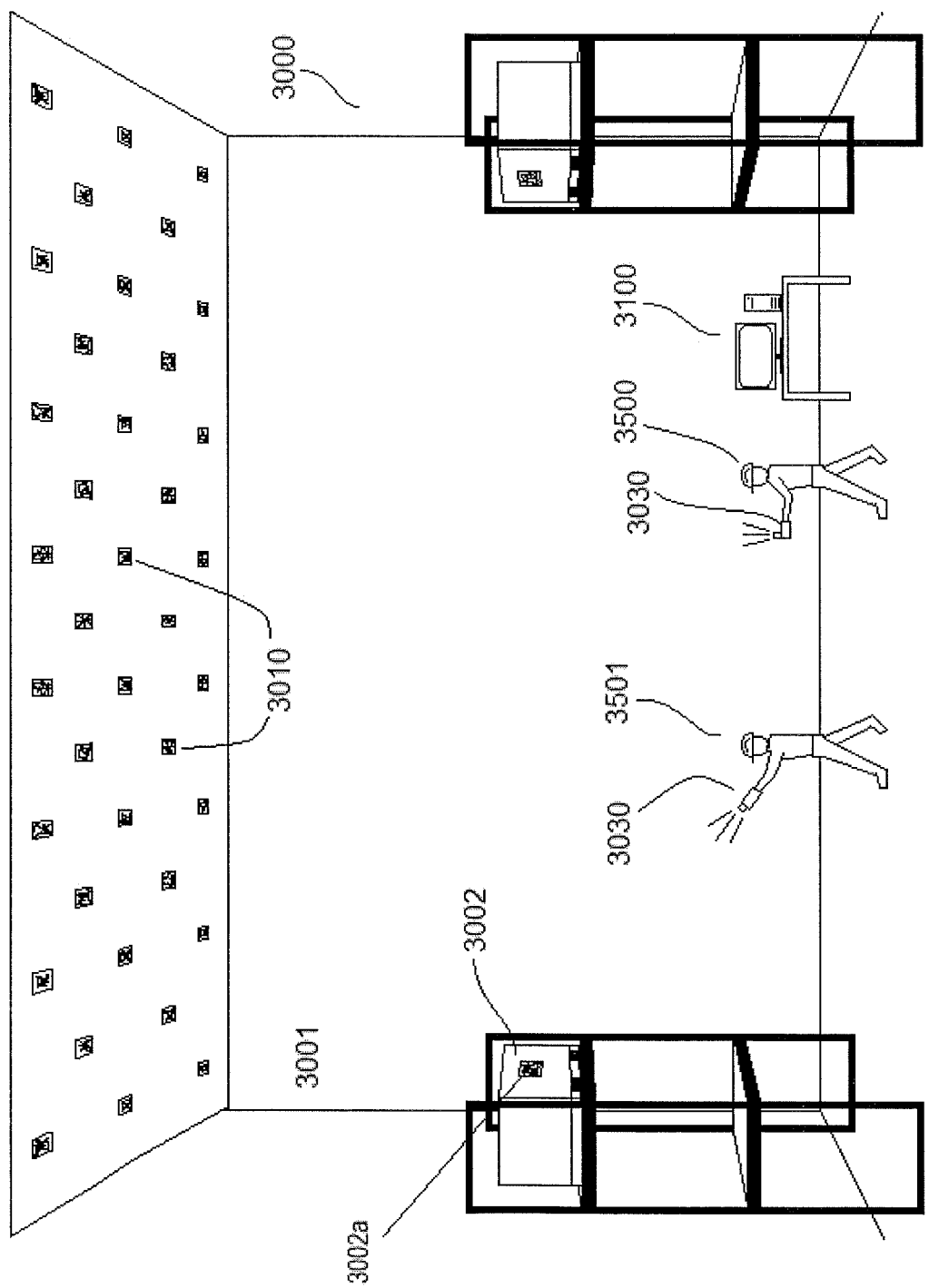
FIG. 1C provides a view of the image tracking system and method according to an embodiment of the invention.
Figure 2:
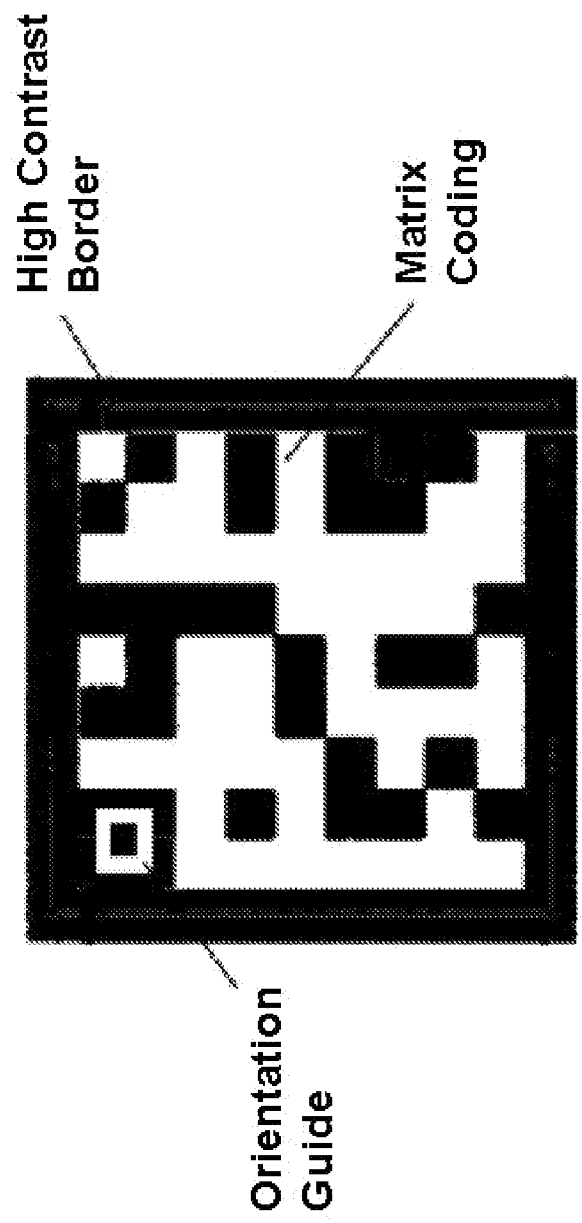
FIG. 2 provides a view of an example matrix code.
Figure 3:
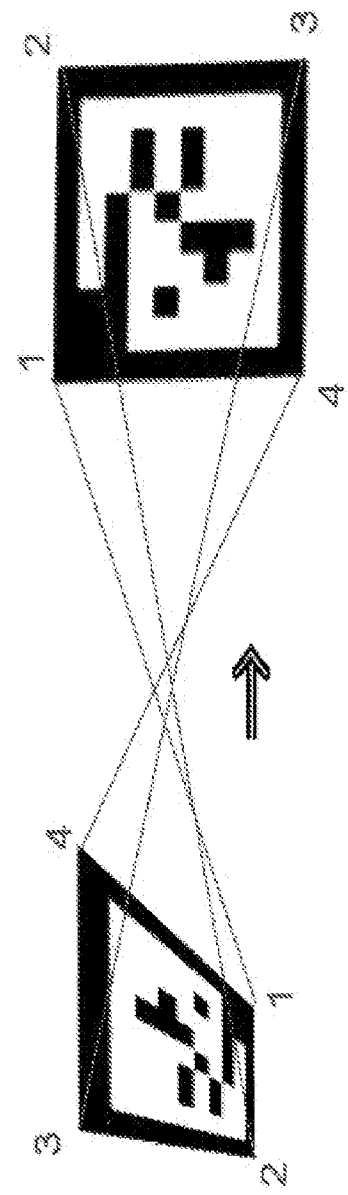
FIG. 3 provides a visual representation of a transformation using translation and rotation vectors.
Figure 4:
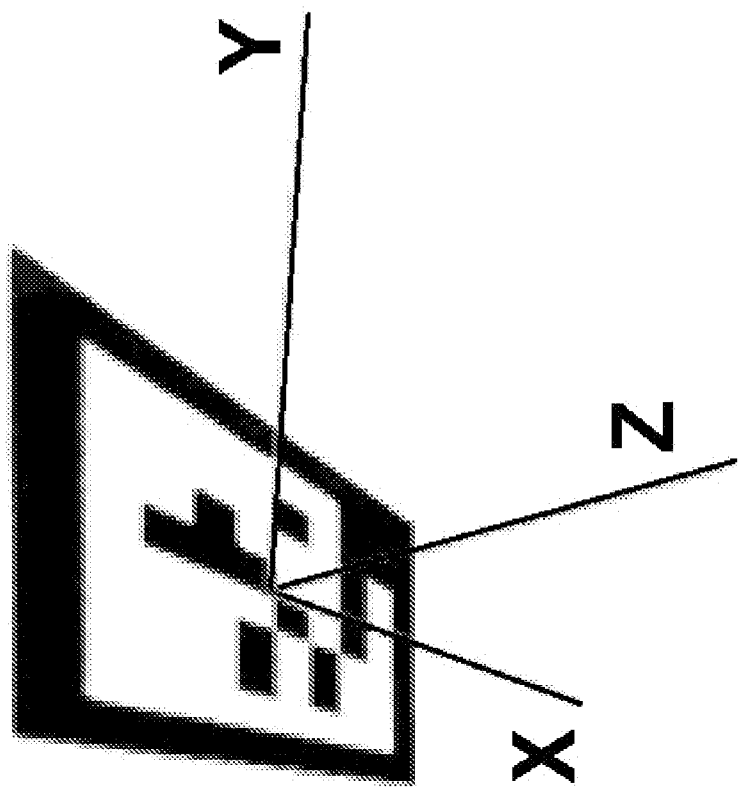
FIG. 4 provides a view of an optical marker as an origin in a three-dimensional coordinate system.

Referring to the drawings, wherein like reference characters designate like or corresponding parts throughout the several views, and referring particularly to FIGS. 1A-1C, it is seen that the present invention includes various embodiments of a tracking system having an automated process for tracking the movement and storage of containers or objects within a pre-defined space.

As seen in FIGS. 1A and 1B, a tracking system 1000 is provided for tracking and handling containers, boxes, palettes, packages, or other objects within a pre-defined space that may be used to house or store such items. The pre-defined space may be any number of enclosures or areas that can be outfitted with machine-readable static optical markers and can be set up with defined boundaries, such as a warehouse, a retail store space, a storage yard, a hangar, etc. The example shown in FIGS. 1A-1B includes a warehouse (1001, 2001) as the pre-defined space. The pre-defined space may have machine-readable static optical markers 1010, 2010 placed in elevated areas such as the ceiling (if present), upper portions of vertical walls, upper portions of pillars or beams, lamp posts, other elevated structures, and/or other surfaces that are unobstructed by storage structures, objects or containers 1002, 2002 within the pre-defined space. The machine-readable optical markers 1010, 2010 may be attached directly to building structures without the necessity of affixing them first to a secondary surface.

The example shown in FIG. 1A includes machine-readable static optical markers 1010 positioned on the ceiling of the warehouse 1001 such that they can be viewed with a clean line-of-sight from a position on the floor of the warehouse 1001, even with containers or other structures 1002 positioned in various locations on the floor of the warehouse 1001. A sufficient number of machine-readable optical markers 1010 in pre-determined spatial arrangement are provided such that at least one position marker 1010 is visible to an image sensor (e.g., a camera mounted on a vehicle, a camera on a mobile computing device held by a person, etc.) from all locations within the pre-defined space 1001. The example shown in FIG. 1B includes machine-readable optical markers 2010 positioned on the ceiling of warehouse 2001, as well as other elevated locations that can be detected from any or virtually any position on the floor within the warehouse 2001 with a clean line-of-sight, even with containers or other structures 2002 positioned in various locations on the floor of the warehouse 2001. A sufficient number of machine-readable optical markers 2010 in pre-determined spatial arrangement are provided such that at least one position marker 2010 is visible to an image acquisition system (e.g., a camera mounted on a vehicle, a camera on a mobile computing device held by a person, etc.) from all locations within the pre-defined space 2001.

The tracking system may include a network of computing devices connected by a node 1100, which may be a general purpose computer or server that is in electronic communication with various elements of the tracking system 1000. The network node 1100 may be in wireless electronic communication with one or more mobile computing devices 1030, which may be handheld or mounted on a vehicle 1020. The mobile computing devices 1030 of the tracking system may be programmed with a number of software programs for interpreting electronic data received from image sensors (e.g., digital cameras as described herein) included in vehicles 1020 and/or mobile computing devices 1030 integrated into the tracking system, and, optionally, GPS satellite navigation receiver solutions from mobile computing devices, inertial navigation data from mobile computing devices, and other forms of data that aid in determining the location of the image sensors. The mobile computing devices 1030 may thus act as image processing hosts that execute a number of programs that are able to calculate the position of the mobile computing device 1030 and objects or containers 1002 within the warehouse 1001.

A digital model of the warehouse 1001 may be saved in a digital memory of the mobile computing devices 1030 and the network node 1100, which may serve as a digital construct in which a digital record of the location and movements of each of the containers or other objects 1002 in the pre-defined space 1001 may be recorded for reference. In some embodiments, and without limitation, rather than simply saving the coordinates of the containers or other objects 1002 within a digital map, a digital model of the container may be digitally saved as a virtual object within the digital model. The digital model of the container may include the dimensions of the container and it may be positioned within the digital model in a location that corresponds to its real-world location within the warehouse 1001. The digital model of the pre-defined space 1001 may be a virtual reality environment, in which the containers or objects are stored, as a digital copy of the actual pre-defined space (warehouse 1001), including the physical features therein. Once the pre-defined space 1001 is selected and measured for physical dimensions, a digital model of the pre-defined space may be created that includes accurate physical dimensions of the pre-defined space 1001 and all non-moveable physical features, such as stacking lighting installations, pillars, beams, interior walls and corners, multiple elevation levels, slopes, and other physical features that would impact the movement and storage of containers and other objects within the pre-defined space 1001. Additionally, a pre-determined arrangement of machine-readable optical markers 1010 may be included in the digital model. The pre-determined arrangement may take into account the distance at which an image sensor (e.g., digital cameras as discussed herein) may perceive the machine-readable optical markers 1010 with sufficient resolution for image recognition and processing software to accurately interpret the coding data on the machine-readable optical marker 1010.

The machine-readable optical markers 1010 may be machine readable matrix codes that encode the identity and position of each machine-readable optical marker 1010 within the pre-defined space 1001. Vehicles 1020 or mobile computing devices 1030 integrated into the tracking system include optical image sensors (e.g., 1021, 1022) operable to perceive the matrix codes provided on the machine-readable optical markers (e.g., digital cameras as discussed herein). These machine-readable optical markers 1010 act as coordinate references for the tracking system to allow an image processing host to calculate the locations of containers or other objects 1002 within the pre-defined space 1001, and provide instructions for locating containers or other objects 1002 once they are positioned within the pre-defined space 1001. The machine recognizable matrix codes may be arranged on the machine-readable optical markers 1010 at predetermined positions, allowing machine-readable optical marker coding translation software to determine the position of the machine-readable optical marker 1010 by analyzing the unique symbols on the machine-readable optical markers 1010. The locations of the machine-readable optical markers 1010 may be coded into the matrix code itself, and/or may be stored in an electronic memory of the image processing host or within a memory of the network node 1100. Exact position coordinates and rotational orientation are determined through computer-programmed instructions that are based upon image analysis by the image recognition and processing software of image data, i.e., camera picture elements (pixels), acquired by the image sensors of the mobile computing devices.

The machine-readable optical markers 1010 may be read by image sensors (e.g., digital cameras as discussed herein) and the image data may then be analyzed by the image recognition and processing software to interpret the coding on the machine-readable optical marker 1010 and identify the particular machine-readable optical marker 1010, the orientation of the marker relative to the image sensor that collected the image data (e.g., the rotation and translation vectors of the machine-readable optical marker relative to the image sensor), and the distance of the machine-readable optical marker 1010 from the image sensor.

The tracking system 1000 may include transport vehicles 1020 that include one or more image sensors 1022, 1021 for reading the static optical markers 1010 within the warehouse 1001. The transport vehicles 1020 may be forklifts or other transport vehicles operable to transport containers or other items 1002 within the warehouse. The one or more cameras 1021 may be positioned on an upper surface of the transport vehicle 1020 to allow for an unobstructed view of the static optical markers 1010 positioned on the ceiling of the warehouse 1001, allowing the image sensors to continuously capture images of the static optical markers 1010 to allow the image processing host to determine and update the current position of the transport vehicle 1020.

As shown in FIG. 1B, the optical markers 2010 may be positioned on various structures within the warehouse 2001, such as the ceiling, and upper portions of walls, pillars, and other structures. The static optical markers 2010 may be positioned at elevated levels such that several static optical markers 2010 are visible from any location within the pre-defined space 2001. The transport vehicles 2020 may include a plurality of image sensors 2021, 2022 for reading the machine-readable optical markers 2010 within the warehouse 2001. The plurality of image sensors 2021, 2022 may be combined in an array of image sensors 2021 that are arranged such that they cover a large area (e.g., a hemispheric view or substantially spherical view of the environment), wherein the view captures an upward facing hemispheric or substantially hemispheric view of the warehouse 2001. In some embodiments, the images provided by the plurality of image sensors may be analyzed individually by the image processing host. The array of image sensors 2021 may allow optical markers 2010 positioned on structures other than a ceiling to be captured with sufficient resolution and accurately analyzed by the image processing host. The containers or object 2002 may include machine-readable optical markers thereon (object markers 2002a), and the image sensors 2021 may capture images of the object markers 2002a. The image sensors may be located in other or additional positions on the vehicle as well. For example, in some embodiments, the static markers may be located on the ceiling and the floor of the pre-defined space, and the image sensors may be located both on the upper and lower portions of the vehicles.

The tracking systems 1000 and 2000 may also include at least one image sensor (1022 and 2022, respectively) facing in a forward or lateral direction in order to read the markers on the containers or objects 1002 and 2002. The upward facing image sensors 1021 and 2021 may be operable to capture images of optical markers positioned on the containers or objects themselves, although it is to be understood that forward or lateral facing image sensors 1022 and 2022 may also be operable to capture images of the optical markers positioned on the containers or objects.

The optical markers, both static and object markers, may be used by the tracking system to identify the real-world position of the mobile computing device, and the vehicle to which it may be attached. The image sensors 1021, 2021 may capture images of static optical markers 1010, 2010 positioned within the warehouse 1001, 2001 and analyze the images to determine the real-world location of the image sensors 1021, 2021. In the case of object markers 1002a, 2002a placed on containers or objects 1002, 2002 having known positions, the object markers may also be used by the image processing host to determine the location of a mobile computing device 1030 or vehicle 1020 or 2020 moving through the warehouse 1001 or 2001. The following steps provide an exemplary process for determining the location of the mobile computing device within the pre-defined space:

a. The image recognition and processing software analyzes the image data captured by an image sensor for the presence of optical markers (static markers 1010/2010 and object markers 1002a/2002a) and identifies optical markers present in the image data in sufficient resolution;

b. The image recognition and processing software analyzes features in the matrix code of the optical markers 1010/2010 identified in the image data to perform a unwarping process to rectify the image of the optical markers 1010/2010 to provide a plan view of the optical markers that can be read by the image recognition and processing software, and reads the data provided in the coding of the optical markers;

c. The image recognition and processing software determines the real-world position of the optical markers 1010/2010 within the warehouse 1001/2001 by retrieving a record for each of the optical markers using the identification data provided in the matrix code;

d. Performing a pose estimation process to determine the rotation and translation vectors of the mobile computing device relative to the optical markers 1010/2010;

e. The image recognition and processing software determines the real world position of the mobile computing device 1030/1031/2031 in the warehouse 1001/2001 by:

1. Transforming the positions of the mobile computing device 1030/1031/2031 and the optical marker 1010/2010, such that position of the optical marker 1010/2010 is used as an origin of a three-dimensional coordinate system, and 2. Calculating the position and orientation of the mobile computing device 1030/1031/2031 within the warehouse 1001/2001 based on the known position of the optical marker 1010/2010 (including a known height), the rotation and translation vectors produced by pose estimation process, an estimated distance between the optical marker 1010/2010 and the mobile computing device 1030/1031/2031 based on the number of pixels occupied by the optical marker 1010/2010 in the captured image, and other data (e.g., a known or estimated height of the mobile computing device 1030/1031/2031, and 3. In some implementations, step 2 is repeated for each of the optical markers 1010/2010 in the captured images to provide multiple calculations of the real-world position of the mobile computing device 1030/1031/2031, which may then be averaged by the image recognition and processing software to provide a precise estimate of the location; and f. The real-world position of the mobile computing device 1030/1031/2031 may then be translated to a virtual position within a computer-generated model of the warehouse 1001/2001 by the position translation software.

These steps may be performed on a continuing, intermittent basis to track the movement of the vehicle 1020/2020 or mobile computing device 1030 through the warehouse 1001/2001 and create a digital record of such movement. The image sensor(s) of the mobile computing device 1030 capture and analyze images of optical markers (static markers 1010/2010, and in some instances object markers 1002a/2002a) at intervals (e.g., at an interval length in a range of about 0.01 to about 1 second) to provide an updated position for the mobile computing device 1030 or vehicle 1020/2020 (and an object or container it is carrying) within the warehouse 1001/2001.

The image sensors 1022, 2022 also allow the tracking system to track containers or objects (e.g., 1002 or 2002) through the warehouse 1001/2001. By capturing an image of an optical marker on the container or object, the tracking system can identify the container or object 1002/2002 prior to or after the placement of the container in the pre-defined space (e.g., 1001 or 2001). Once the container or object 1002/2002 is recorded in the tracking system, the tracking system is able track and record the position thereof as it is moved into, through, and/or out of the pre-defined space 1001 or 2001. Data regarding the container or object (e.g., date, time, location, final location in the pre-defined space, etc.) may also be recorded in the memory of the tracking system in the record for the particular container or object 1002/2002.

The movement and location of the container or object 1002/2002 may be tracked by (1) first identifying the container or object 1002/2002 by manual input of the identification code and/or scanning or capturing an image of a matrix code of the object marker 1002a/2002a thereon to allow the image processing host to identify the specific container or object 1002/2002, (2) moving the container or object 1002/2002 through the pre-defined space in conjunction with a mobile computing device (e.g., on a transport vehicle 1020/2020), and (3) tracking the movement and location of the mobile computing device through the pre-defined space 1002/2002 and recording such movement and location in a memory of the image processing host. The movement and position data of the mobile computing device may be recorded as the movement and position of the associated container or object 1002/2002 that was moved in conjunction with the mobile computing device. Once the container or object 1002/2002 reaches its destination (e.g., a storage location in a warehouse), the image processing host may record such location as "stored position" for the particular container or object in a memory.

The system may also be able to monitor and track the positions of containers or objects 1002/2002 that are already within the pre-defined space 1001/2001. The object markers 1002a/2002a of many of the objects or containers 1002/2002 within the pre-defined space 1001/2001 may be perceivable by the image sensor(s) of a mobile computing device 1030/1031/2031 present in the pre-defined space 1001/2001, whether they be mounted on a vehicle 1021/1022/2021/2022 or carried by a person 1030/1031/2031. In some examples, objects or containers 1002/2002 may be moved into the pre-defined space 1001/2001 with a vehicle or other device or means that does not include a mobile computing device. In such examples, a human operator may use a mobile computing device (1021/1022/2021/2022 or 1030/1031/2031) incorporated into the tracking system to identify the objects or containers (1002/2002) after they have been positioned and stored in the pre-defined space 1001/2001. The mobile computing device (1021/1022/2021/2022 or 1030/1031/2031) may be used to deliberately capture images of the object markers 1002a/2002a on the objects or containers 1002/2002, identify their real-world locations within the pre-defined space 1001/2001, translate their positions into virtual positions within the computer-generated model of the pre-defined space 1001/2001, and record the positions in the tracking system database.

Also, mobile computing devices (1021/1022/2021/2022 or 1030/1031/2031) moving through the pre-defined space 1001/2001 may capture images and the image recognition and processing software may identify any markers that are captured within the image, including any unobscured object markers 1002a/2002a present in the image in sufficient resolution. The image recognition and processing software and the position translation software may then process the data from the marker image and calculate the position of the objects or containers 1002/2002 relative to the position of the mobile computing device (1021/1022/2021/2022 or 1030/1031/2031) within the pre-defined space 1001/2001 to (1) aid in determining the current position of the mobile computing device, and/or (2) provide an updated position for the object or container within the pre-defined space. In such embodiments, the ability of the mobile computing devices (1021/1022/2021/2022 or 1030/1031/2031) to detect the locations of objects or containers 1002/2002 having markers 1002a/2002a perceivable from the mobile computing device may allow for additional data in determining the position of mobile computing device and for verification and updates of the locations of the objects and containers 1002/2002 within the pre-defined space 1001/2001.

The location of objects or containers 1002/2002 within the pre-defined space 1001/2001 and captured in images by mobile computing device (1021/1022/2021/2022 or 1030/1031/2031) may be determined through the following exemplary process:

a. The image sensor (1021/1022/2021/2022 or 1030/1031/2031) captures an image of an object marker 1002a/2002a on a container or object 1002/2002;

b. The image recognition and processing software analyzes the image data for the presence of an optical marker 1002a/2002a, locates any object markers in the image;

c. and then analyzes the features of the matrix code data on the object marker 1002a/2002a identified in the image data to determine the orientation of the object marker relative to the mobile computing device (1021/1022/2021/2022 or 1030/1031/2031) through the pose estimation process;

d. The image recognition and processing software determines the real world position of the object marker 1002a/2002a in the pre-defined space 1001/2001 by calculating the position and orientation of the object marker 1002a/2002a within the pre-defined space 1001/2001 based on a previously determined, known position of the mobile computing device (see process described above), the rotation and translation vectors for the object marker 1002a/2002a, an estimated distance between the optical marker 1002a/2002a and the mobile computing device (1021/1022/2021/2022 or 1030/1031/2031) based on the number of pixels occupied by the optical marker 1002a/2002a in the captured image, and other data (e.g., a known or estimated height of the mobile computing device, etc.);

e. The matrix code of the object marker 1002a/2002a may include identifying information for the particular object or container 1002/2002 that may be utilized by lookup process software to determine whether a record exists in the database of the tracking system and whether the location of the object or container 1002/2002 has been recorded;

1. If the location has been previously recorded, the lookup process software compares the position of the object or container 1002/2002 calculated by the image recognition and processing software to the recorded position of the object or container, a) If the calculated position and the recorded position match, the location is confirmed,
b) If the calculated position and the recorded position do not match, the virtual location record of the object or container 1002/2002 is updated in the computer-generated model of the pre-defined space 1001/2001;

2. If the location has not been recorded, the position translation software records a virtual location of the object or container 1002/2002 in the computer-generated model of the pre-defined space.

The record for a particular object or container stored in the warehouse 1001/2001 may be created or updated automatically by the foregoing process. Such records may also be retrieved and updated by a human operator through a mobile computing device (1021/1022/2021/2022 or 1030/1031/2031), network node 1100/1200, or other electronic devices that are in electronic communication with the tracking system. For example, as shown in FIG. 1C, a human operator 3500 can use a mobile computing device 3030 to direct the human operator 3500 a particular to a particular container or object 3002. The human operator 3500 may submit a query into a lookup process software on the mobile computing device 3030 that is operable to access a database stored in the memory of the image processing host (mobile computing device 3030 or network node 3100) that includes the records of each container or object 3002 that is stored within the warehouse 3001. The query may be based on various data, such as the date of placement of the container or object 3002 in the pre-defined space 3001, the goods in the container or description of the object 3002, the lot or batch of the container or object 3002, and other relevant data that may be included in the record of the container or object 3002. The image processing host may then receive both the query data from the lookup process software and image data from an image sensor of the mobile computing device 3030 and provide directions to the container or object 3002 via directions provided on the display screen of the mobile computing device 3030. In some embodiments, the query, location, and directions process may include the following steps:

a. The mobile computing device 3030 captures images of the interior of the warehouse 3001, and image recognition and processing software analyzes the image data and provides a real-world location for the mobile computing device 3030, as discussed above;
b. The position translation software provides a virtual location for the mobile computing device 3030 in a computer-generated model of the warehouse 3001, as discussed above, and provides data regarding the virtual location of the mobile computing device 3030 to the navigation processing software;
c. The lookup process software identifies all records in the database of the tracking system to which the query data apply;
d. The lookup process software provides locations of the container(s) or object(s) 3002 identified by the query to the navigation processing software;
e. The navigation processing software uses the virtual locations of the mobile computing device 3030 and the container(s) or object(s) 3002 to calculate a shortest route between them, which may include creating one or more possible routes between the mobile computing device 3030 and the container(s) or object(s) 3002 identified by the query, taking into account the locations of all containers or objects and all physical features (e.g., pillars, shelving, walls, doorways, etc.) that are identified in the tracking system database as being within the warehouse 3001. The one or more routes may be calculated to avoid intersection with all container(s) or object(s) 3002 and physical features, and the navigation process software may then select the route having the shortest traveled distance.
f. The navigation process software may then provide the route to the human operator 3500 through the graphic display screen of the mobile computing device 3030. The route may be presented within a map on the display screen of the mobile computing device 3030 or as graphical overlay over real-time image output provided on the display screen from an image sensor of the mobile computing device 3030, wherein the navigation processing software may generate graphical indicators such as straight, curvilinear, and bent arrows that show the routed direction of travel toward the container(s) or object(s) 3002, and present such indicators over images captured from an image sensor of the mobile computing device 3030. The graphics may also include outlining or other graphic indicators to identify the specifically sought container(s) or object(s) 3002 within the images displayed on the display screen of the mobile computing device 3030. The human operator 3500 can visually follow the graphic indicators to the desired container(s) or object(s) 3002.
g. In cases in which multiple containers or objects 3002 are identified by the query, the route may include multiple destinations corresponding to the locations of each of the containers or objects 3002 within the pre-defined space 3001, and the navigation process software may calculate multiple routes between the mobile computing device 3030 and the containers or objects 3002. The navigation process software may include steps that reduce the number of required calculations, such as clustering containers and objects 3002 that are in close proximity (e.g., within the same radius of up to 10 feet) as a single point, and limiting the number of containers/objects 3002 or end points considered in the route. For example, the considered end points may be limited to up to 5.

The above-described process for providing directions may be carried out in the same way for transport vehicles (e.g., vehicles 1020 and 2020), allow the human operator to the vehicle to guide the vehicle 1020/2020 to the location of the container(s) or object(s) 1002/2002 identified by the query. The transport vehicle 1020/2020 may then be used to retrieve the container(s) or object(s) 1002/2002 and transport them as desired. In such processes, the location of the retrieved container(s) or object(s) 1002/2002 may be tracked from the stored location from which it is retrieved to its new location. A move to a new location within the pre-defined space 1001/2001/3001 may be tracked and recorded through the automated processes of the tracking system discussed herein. If the new location is a different storage space or a hauling vehicle (e.g., a train, tractor trailer, or other hauling vehicle), data regarding the movement of the object or container 1002/2002/3002 to locations outside of the pre-defined space 1001/2001/3001 may be entered manually or by other methods to connect the data from the automated processes of the tracking system with information regarding later destinations for the objects or containers 1002/2002/3002. This may allow the tracking system to be used to provide a complete record for each container(s) or object(s) 1002/2002/3002 that arrives and leaves the pre-defined space 1001/2001/3001 and associated facilities, without gaps in the record.

The integrity of records for goods is typically lost when they are combined in large lots for storage (e.g., in a warehouse). The tracking system 1000/2000/3000 of the present invention allows for automated and precise tracking of goods and containers of goods to be stored in warehouses or other storage facilities. The tracking records created by the automated processes of the tracking system 1000/2000/3000 when used in combination with reliable data regarding the source of the objects or containers 1002/2002/3002 and reliable data regarding the destination of the objects or containers 1002/2002/3002, the tracking system 1000/2000/3000 of the present invention may allow a user to trace the path and timeline of a particular object or container 1002/2002/3002 from its source through its routes of delivery to its ultimate source. Such detailed records are highly useful in situations in which goods (e.g., agricultural goods) are found to be contaminated or otherwise faulty. The detailed records of the present tracking system 1000/2000/3000 may allow for more accurate identification of the source of contamination or flaw, and may thereby reduce the volume of goods that need to be recalled from the marketplace as a result of such contamination or flaw. This may significantly improve economic efficiency and reduce the costs incurred by businesses that are required to recall goods.

The tracking system 1000/2000/3000 of the present invention may also be used by human operators to retrieve data regarding a particular container or object by reading an optical marker positioned on the container or object 1002/2002/3002. As shown in FIG. 1C, a human operator 3501 may capture an image of an optical marker on a container or object 3002, and the image data may be analyzed by the image processing host (e.g., mobile computing device 3030) to determine the identity of the particular container or object 3002 through the lookup process software. The lookup process software may then retrieve from the database of the tracking system the data stored in the record for the particular container or object 3002 and provide it on the display screen of the mobile computing device 3030. The human operator 3501 may then review the data from the record to determine the contents of the container 3002, the lot or batch of the goods within the container or the object 3002, the source of the goods in the container or of the object 3002, and various other data stored in the record. In some embodiments, and without limitation, the data in the record for the particular container or object 3002 may be updated or edited by a human operator 3501 through a mobile computing device 3030. This may be to correct an error made in earlier data entry, to change a future shipping date for the container or object 3002, to change the shipping destination for the object or container 3002, to identify the container or object 3002 as recalled or to be destroyed or quarantined in the case of a finding of contamination or flaw in goods or objects from the same lot, batch, source, etc., or other data corrections or additions. The data in a record for a particular container or object 3002 may also be accessed and altered through the mobile computing device 3030, the network node 3100, or other electronic devices that are incorporated in the tracking system 1000/2000/3000. In some embodiments, the optical identification of the container or object 3002, the lookup process, and editing process may include the following steps:

a. The image sensor captures an image of an optical marker 3002a on the selected container or object 3002.

b. The image recognition and processing software analyzes the image data for the presence of optical marker 3002a and performs an unwarping process to rectify the image of the optical marker 3002a to provide a plan view of the optical marker that can be read by the image recognition and processing software, and reads the data provided in the coding of the optical marker;

c. The image recognition and processing software may then identify the optical marker 3002a by reading coding on the optical marker 3002a;

d. Retrieving a corresponding record in the database of the tracking system 3000 for the particular container or object 3002, and retrieves the data contained in the record for the particular container or object 3002.

e. Performing a pose estimation process to determine the rotation and translation vectors of the mobile computing device relative to the optical marker 3002a;

f. Determining the location of the container or object 3002 by calculating the position and orientation of the object marker 3002a relative to the mobile computing device based on the known position of the mobile computing device, the rotation and translation vectors produced by pose estimation process, an estimated distance between the optical marker 3002a and the mobile computing device based on the number of pixels occupied by the optical marker 3002a in the captured image, and other data (e.g., a known or estimated height of the mobile computing device).

CONCLUSION/SUMMARY

The present invention provides systems and methods for tracking containers and objects in a storage and shipping environment that allows for automated identification, tracking, and data record keeping. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

The invention claimed is:

1. A system for tracking the position of objects within a predefined space, comprising:

a. a plurality of unique static markers, each comprising a machine-readable code, arranged in predetermined locations within the predefined space;

b. a plurality of unique object markers positioned on each of said objects;

c. an electronic image acquisition device having a machine vision system, the machine vision system comprising an image sensor and image capture electronics, for acquiring images of said unique static markers and said object markers; and d. an image processing system for analyzing pixels in the acquired image to determine an identity of each static marker and object marker in said acquired image, retrieve location data from a database for each static marker in said acquired image, and determining a position of each static marker and each object marker relative to the image acquisition device,
  wherein said image processing system is operable to determine a relative position of said image acquisition device to a plurality of static markers by:
  determining the position and orientation of said image acquisition device relative to that of a first static marker by performing a pose estimation calculation,
  calculating the position and orientation of the image acquisition device relative to the predefined space based on a location data of said first static marker retrieved from said database, a pose estimation calculation for said first static marker, and an estimation of the distance of the first static marker from the image acquisition device based on a size of said first static marker in said image,
  determining the position and orientation of said image acquisition device relative to that of a second static marker by performing a second pose estimation calculation,
  calculating the position and orientation of the image acquisition device relative to the predefined space based on a location data of said second static marker retrieved from said database, said second pose estimation calculation for said second static marker, and an estimation of the distance of the second static marker from the image acquisition device based on a size of said second static marker in said image, and
  performing an averaging calculation to provide multiple calculations of the position of the image acquisition device to provide an averaged estimate of the location.

2. The system of claim 1, further comprising a machine-readable memory for storing a digital model of said predefined space, positions of said static markers, positions of said object markers, and identification data regarding said objects.

3. The system of claim 2, wherein said image processing system is operable to determine orientation of each said static marker relative to the image acquisition device by performing a unwarping process to compensate for skew in a view of said static marker provided in said image and generate a plan view of said static marker, and analyze optical features within said plan view of said static marker to read coding provided in said optical features and retrieve identification data from said coding.

4. The system of claim 3, wherein said image processing system is operable to compare said identification data to records of each of said plurality of static markers stored in said machine-readable memory to identify a matching record for said static marker and retrieve location data of said static marker from a record for said static marker.

5. The system of claim 2, wherein said image processing system is operable to analyze optical features within each said object marker in said image to determine an orientation of said object marker relative to the image acquisition device by performing a unwarping process to compensate for skew in a view of said object marker provided in said image and generate a plan view of said object marker.

6. The system of claim 5, wherein said image processing system is operable to analyze optical features within said plan view of said object marker to read coding provided in said optical features and retrieve identification data from said coding.

7. The system of claim 6, wherein said image processing system is operable to compare said identification data to records of each of said plurality of object markers stored in said machine-readable memory to identify a matching record for said object marker and retrieve location data of said object marker from a record for said object marker.

8. The system of claim 7, wherein said image processing system is operable to perform a pose estimation calculation that includes calculating rotation and translation vectors based on said optical features of said object marker to determine orientation of the object marker relative to the image acquisition device and the relative positions of said image acquisition device and said object marker.

9. The system of claim 8, wherein said image processing system is operable to determine the location of said object marker in said predefined space based on the pose estimation calculation for the object marker, a known position of said image acquisition device within said predefined space, and a perceived size of said object marker in said image.

10. The system of claim 9, wherein said image acquisition device is set as xyz origin within a coordinate system in the step of determining the location of said object marker in said predefined space.

11. The system of claim 1, wherein
  a. said image acquisition device is movable through said predefined space and is operable to acquire images of the predefined space at regular intervals;
  b. said image processing system is operable to analyze each of said images to identify each static marker and object marker therein, retrieve said location data from said database regarding a position of each said static marker and each said object marker within the predefined space, and provide an updated location of said image acquisition device based on the position of said image acquisition device relative to a position of one or more of said static markers in said image.

12. The system of claim 11, wherein said image processing system is operable to determine a location of said image acquisition device based on the position of said image acquisition device relative to a position of a single static marker in said image.

13. A method for tracking and retrieving an object in a predefined space, comprising:
  a. placing a plurality of unique static markers, each comprising a machine-readable code, in said predefined space arranged in predetermined locations;
  b. creating a database stored on a machine-readable memory, said database including records for each of the static markers, each of said records including location data of the corresponding static marker in said predefined space;
  c. placing a unique object marker on each of a plurality of objects to be positioned in said predefined space;
  d. generating a record for each object marker in said database that includes identification data of the object marker and data regarding the object on which it is positioned;
  e. placing each said object in a storage position in said predefined space; and
  f. recording the storage position in said record for said object marker positioned on said object;
  g. capturing an image of a static marker using an image acquisition device, said image acquisition device having a machine vision system that includes an image sensor and image capture electronics, and an image processing system operable to analyze an image to identify static markers and object markers present in the image; and
  h. calculating the position and orientation of the image acquisition device within the predefined space based on a pose estimation calculation for said static marker using an affine transformation of the image of the static marker and an estimation of the distance of the static marker from the image acquisition device estimated from a size of said static marker in said image.

14. The method of claim 13, wherein said recording of the storage position of said object includes capturing a digital image of said object marker using an electronic image acquisition device.

15. The method of claim 14, wherein said image acquisition device analyzes optical features within said static marker with the image processing system to determine orientation of said at least one static marker relative to the image acquisition device.

16. The method of claim 15, further comprising generating a plan view of said static marker and analyzing the optical features within said plan view of said static marker to read coding provided in said optical features and retrieve identification data from said coding.

17. The method of claim 16, further comprising comparing said identification data to said records of each of said static markers stored in said machine-readable memory to identify a matching record for said static marker and retrieve location data of said static marker from a record for said static marker.

18. The method of claim 17, wherein said pose estimation calculation includes calculating rotation and translation vectors based on said optical features of said static marker and said static marker is set as an xyz origin within a coordinate system.

19. The method of claim 14, further comprising translating the position and orientation of said image acquisition device into a digital representation of the image acquisition device in a digital model of said predefined space.

20. The method of claim 19, wherein said recording of the storage position of said object further comprises using said image processing system to determine a position of said object within the predefined space based on the determined position of said image acquisition device, a pose estimation for said object marker positioned on said object, and an estimation of the distance of the object marker from the image acquisition device based on a size of said object marker in said image.

21. The method of claim 20, wherein said pose estimation for said object marker to compensate for skew in a view of said object marker provided in said image and generate a plan view of said object marker using said image processing system.

22. The method of claim 21, further comprising analyzing optical features within said object marker to read coding provided in said optical features and retrieve identification data from said coding using said image processing system.

23. The method of claim 21, wherein said pose estimation calculation includes calculating rotation and translation vectors based on said optical features of said object marker to determine orientation of the object marker relative to the image acquisition device and the relative positions of said image acquisition device and said object marker.

24. The method of claim 23, further comprising determining the location of said object marker in said predefined space based on the pose estimation calculation for the object marker, a known position of said image acquisition device within said predefined space, and a perceived size of said object marker in said image, wherein said image acquisition device is set as xyz origin within a coordinate system in the step of determining the location of said object marker in said predefined space.

25. A system for tracking the position of objects within a predefined space, comprising:
   a. a plurality of unique static markers, each comprising a machine-readable code, arranged in predetermined locations within the predefined space;
   b. a plurality of unique object markers positioned on each of said objects;
   c. an electronic image acquisition device having a machine vision system, the machine vision system comprising an image sensor and image capture electronics, for acquiring images of said unique static markers and said object markers; and
   d. an image processing system for analyzing pixels in the acquired image to determine an identity of each static marker and object marker in said acquired image, retrieve location data from a database for each static marker in said acquired image, and determining a position of each static marker and each object marker relative to the image acquisition device, wherein said image processing system is operable to calculate the position and orientation of the image acquisition device within the predefined space based on a pose estimation calculation for a static marker using an affine transformation of an image of the static marker, an estimation of a distance of the static marker from the image acquisition device based on a size of said static marker in said image, and a known location of the image acquisition device.

26. The system of claim 25, wherein
   a. said image acquisition device is movable through said predefined space and is operable to acquire images of the predefined space at regular intervals;
   b. said image processing system is operable to analyze each of said images to identify each static marker and object marker therein, retrieve said location data from said database regarding a position of each said static marker and each said object marker within the predefined space, and provide an updated location of said image acquisition device based on the position of said image acquisition device relative to a position of one or more of said static markers in said image.

27. The system of claim 25, wherein said image processing system is operable to calculate the position and orientation of an object marker within the predefined space relative to the image acquisition device based on a pose estimation calculation of the object marker using an affine transformation of an image of the static marker and an estimation of a distance of the static marker from the image acquisition device based on a size of said static marker in said image, wherein the position of an object within the predefined space is determined based on the calculated position and orientation of the object marker relative to the image acquisition device using the position of the image acquisition device as an xyz axis within the predefined space.

28. The system of claim 27, wherein said image processing system is operable to generate a plan view of said object marker and analyze optical features within said plan view to read coding provided in said optical features and retrieve identification data from said coding.

29. The system of claim 28, wherein said image processing system is operable to compare said identification data to records of each of said plurality of object markers stored in said machine-readable memory to identify a matching record for said object marker and retrieve location data of said object marker from a record for said object marker.

30. The system of claim 27, wherein said pose estimation calculation includes calculating rotation and translation vectors based on said optical features of said object marker to determine orientation of the object marker relative to the image acquisition device and the relative positions of said image acquisition device and said object marker.

\* \* \* \* \*